US008861041B2

(12) United States Patent
Nagase

(10) Patent No.: US 8,861,041 B2
(45) Date of Patent: Oct. 14, 2014

(54) IMAGE READING DEVICE PROVIDED WITH A SPREAD SPECTRUM CLOCK GENERATOR AND CORRECTION WAVEFORM DATA AND AN IMAGE FORMING APPARATUS COMPRISING THE IMAGE READING DEVICE

(75) Inventor: Masaki Nagase, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 393 days.

(21) Appl. No.: 13/231,339

(22) Filed: Sep. 13, 2011

(65) Prior Publication Data

US 2012/0062962 A1 Mar. 15, 2012

(30) Foreign Application Priority Data

Sep. 15, 2010 (JP) ................................ 2010-207223

(51) Int. Cl.
*H04N 1/38* (2006.01)
*H04N 1/40* (2006.01)
*H04N 1/00* (2006.01)

(52) U.S. Cl.
CPC ....... *H04N 1/40056* (2013.01); *H04N 1/00933* (2013.01); *H04N 2201/0081* (2013.01)
USPC ........... 358/463; 358/400; 358/443; 358/444; 358/445; 358/406; 382/312; 347/102; 347/9; 84/604; 84/609; 607/46; 348/E05.024

(58) Field of Classification Search
None
See application file for complete search history.

(56) References Cited

U.S. PATENT DOCUMENTS

| | | | | |
|---|---|---|---|---|
| 6,493,830 | B2 * | 12/2002 | Kamei | 713/501 |
| 2004/0013321 | A1 * | 1/2004 | Ohkawa | 382/325 |
| 2009/0059324 | A1 | 3/2009 | Nagase et al. | |
| 2010/0177364 | A1 * | 7/2010 | Yoshigae | 358/483 |
| 2010/0231979 | A1 | 9/2010 | Nagase et al. | |

FOREIGN PATENT DOCUMENTS

| | | |
|---|---|---|
| JP | 04-160870 A | 6/1992 |
| JP | 2000-022959 A | 1/2000 |
| JP | 2002-281252 A | 9/2002 |
| JP | 2008-118366 | 5/2008 |
| JP | 2010-212935 | 9/2010 |

OTHER PUBLICATIONS

InternetArchive, Wikipedia article, "System-on-a-chip", web date of May 22, 2008 from https://web.archive.org/web/20080522154511/http://en.wikipedia.org/wiki/System_on_a_chip.*
Japan Office Action issued Jul. 1, 2014 in Japanese Patent Application No. 2010-207223 A.

* cited by examiner

*Primary Examiner* — Quang N Vo
(74) *Attorney, Agent, or Firm* — Oblon, Spivak, McClelland, Maier & Neustadt, L.L.P.

(57) ABSTRACT

An image reading device is provided with a waveform memory that stores correction waveform data generated based on a digital image signal output from an image signal processing circuit when a light source of the image reading device is turned off, and an image signal correcting circuit that corrects an image signal of an original image using the correction waveform data stored in the waveform memory.

18 Claims, 15 Drawing Sheets

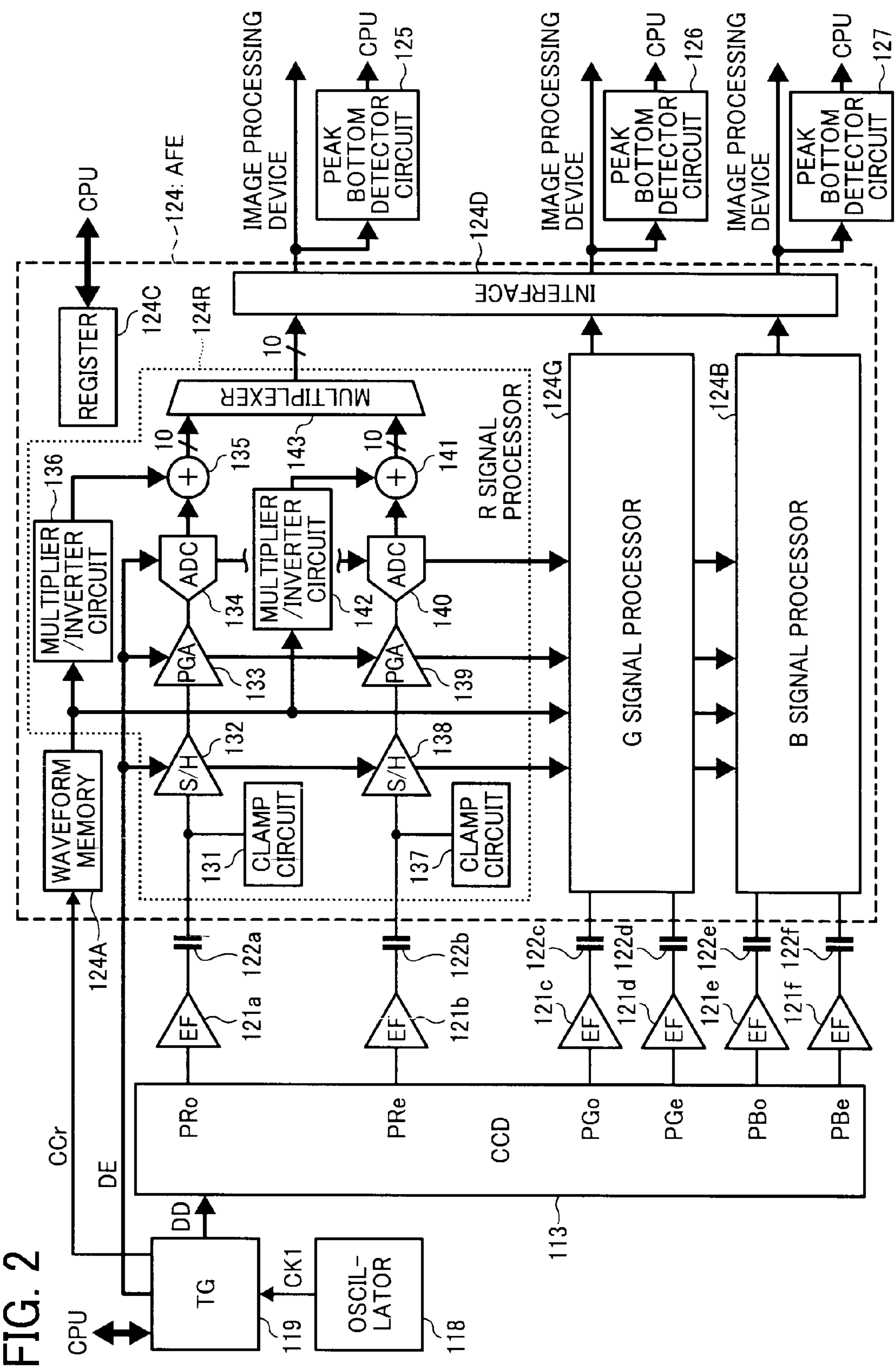
FIG. 2
CPU
TG
119
OSCIL-
LATOR
118
CK1
DD
DE
CCr
113
CCD
PRo
PRe
PGo
PGe
PBo
PBe
EF
121a
121b
121c
121d
121e
121f
122a
122b
122c
122d
122e
122f
124A
WAVEFORM
MEMORY
124: AFE
REGISTER
124C
CPU
MULTIPLIER
/INVERTER
CIRCUIT
136
131
CLAMP
CIRCUIT
S/H
132
PGA
133
ADC
134
135
10
MULTIPLEXER
124R
143
MULTIPLIER
/INVERTER
CIRCUIT
142
137
CLAMP
CIRCUIT
S/H
138
PGA
139
ADC
140
141
10
R SIGNAL
PROCESSOR
124G
G SIGNAL PROCESSOR
124B
B SIGNAL PROCESSOR
10
INTERFACE
124D
IMAGE PROCESSING
DEVICE
PEAK
BOTTOM
DETECTOR
CIRCUIT
125
CPU
126
127

119a
CK2
119ai
VCO
119ah
119aj
DAC
119ag
FILTER CIRCUIT
119ab
WAVEFORM ROM
CCr
119af
CHARGE PUMP CIRCUIT
119ae
PHASE COMPARATOR
DIVIDER
119ad
119ac
DIVIDER
118
118a

CPU
TG
119
OSCIL-LATOR
118
CK1
DD
CCr
DE
CCD
113
PRo
PRe
PGo
PGe
PBo
PBe
EF
121a
121b
121c
121d
121e
121f
122a
122b
122c
122d
122e
122f
124A
WAVEFORM MEMORY
136
MULTIPLIER /INVERTER CIRCUIT
150
DAC
REGISTER
124C
CPU
124: AFE
124R
CLAMP CIRCUIT
131
S/H
132
235a
PGA
133
ADC
134
10
142
151
CLAMP CIRCUIT
137
138
241a
139
140
MULTIPLEXER
143
R SIGNAL PROC-ESSOR
124G
G SIGNAL PROCESSOR
124B
B SIGNAL PROCESSOR
INTERFACE
124D
IMAGE PROCESSING DEVICE
PEAK BOTTOM DETECTOR CIRCUIT
125
126
127

CPU
TG
119
OSCIL-
LATOR
118
CK1
DD
DE
CCr
213a
CCD
PRo1
PRe1
PGo1
PGe1
PBo1
PBe1
PRo2
PRe2
PGo2
PGe2
PBo2
PBe2
AFE
124-1
124-2
PEAK BOTTOM DETECTOR CIRCUIT
IMAGE PROCESSING DEVICE

IMAGE READING DEVICE PROVIDED WITH A SPREAD SPECTRUM CLOCK GENERATOR AND CORRECTION WAVEFORM DATA AND AN IMAGE FORMING APPARATUS COMPRISING THE IMAGE READING DEVICE

CROSS-REFERENCE TO RELATED APPLICATIONS

This patent application is based on and claims priority under 35 U.S.C. §119 to Japanese Patent Application No. 2010-207223, filed on Sep. 15, 2010, in the Japan Patent Office, the entire disclosure of which is hereby incorporated herein by reference.

FIELD OF THE INVENTION

The present invention generally relates to an image reading device provided with SSCG (Spread Spectrum Clock Generator), and an image forming apparatus having the image reading device.

BACKGROUND

With the increased demands for high-speed image reading, the recent image reading devices read image data at high-frequency reading clocks such that reducing EMI (Electromagnetic Interference) has been important to be in compliance with the regulations such as FFC (Federal Communications Communication) or VCI (Voluntary Control Council for Information Technology Equipment).

One approach to reduce EMI is to provide SSCG (Spread Spectrum Clock Generator), which flattens the EMI spectrum by modulating the clock frequency in a slow cycle, a narrow range.

FIG. 14 illustrates a circuit structure of a sensor board section of a background image reading device provided with a SSCG circuit 22. The SSCG circuit 22 applies SSCG modulation to a reference clock signal CK output from an oscillator 21 to output a clock signal CKa to a PLL circuit 23. The PLL circuit 23 multiplies the frequency of the clock signal CKa to output a clock signal CKb to a timing generator circuit 24. Based on the clock signal CKb, the timing generator circuit 24 generates a CCD (Charged Coupled Device) drive signal and an AFE (Analog Front End) drive signal, and supplies the CCD drive signal to an AFE 26 through a CCD 25, an emitter follower (EF) circuit 27 and an alternating-current (AC) condenser 28. The timing generator circuit 24 also supplies the AFE drive signal to the AFE 26. The AFE 26 comprises a clamp circuit 29, a sample hold (S/H) circuit 30, a programmable gain amplifier (PGE) circuit 31 and an A/D converter (ADC) 32. Since the clock signal CKb input to the timing generator circuit 24 is generated based on the clock signal CKa to which SSCG modulation is applied, the CCD drive signal and the AFE drive signal are influenced by SSCG modulation.

The SSCG circuit 22, which is provided downstream the oscillator 21, suppresses the electromagnetic interface (EMI) radiation at the peak frequency. As illustrated in FIG. 15, the clock signal CK output from the oscillator 21 has a waveform S1 with the high peak value. When SSCG modulation is applied to the clock signal CK, the frequency values are spread such that the resultant clock signal CKa has a waveform S2 of FIG. 15.

The background image reading device of FIG. 14 with the SSCG circuit 22 has a drawback such that the offset voltage level of the signal output from the CCD 25 changes in synchronization with the SSCG modulated clock signal CKb, as the clock signal CKb is input to the analog timing generator circuit 24. This results in the level of an image signal to periodically change in one main scanning line even when the image signal is obtained from reading an image of the same intensity levels.

More specifically, referring to FIG. 16(*b*), the frequency of the CCD drive signal fluctuates in a predetermined range around the reference clock frequency, and in a predetermined fluctuation cycle. FIG. 16(*a*) indicates the change in image pixel level obtained by reading an image of uniform intensities in the main scanning direction for one scanning line, with L indicating the lighter values and D indicating the darker values. The image pixel level fluctuates in synchronization with this fluctuation cycle of the CCD drive signal. Assuming that this fluctuation in image pixel level is repeated for a plurality of lines, the resultant read image would have lines PP, or moiré patterns, due to the difference in image pixel level as illustrated in FIG. 17.

In view of this problem, Japanese Patent Application Publication No. 2008-118366 is provided with a PLL (Phase Locked Loop) loop filter circuit, which extracts a voltage signal in synchronization with modulated frequency of the clock signals. The extracted analog voltage signal is applied, in the inversed phase, to an analog image signal output from the CCD to remove noises that are superimposed over the image signal. The signal used for SSCG modulation has a triangle waveform as illustrated in FIG. 18(*a*). When this triangle waveform is applied to the oscillating circuit in the PLL circuit, the signal output from the VCO (voltage controlled oscillator) is distorted as the amplitude and the phase of the signal are shifted due to the intensity or linearity of the VCO. This causes the clock signal output from the PLL circuit to have the waveform as indicated by the solid line of FIG. 18(*b*). In FIG. 18(*b*), the dotted line indicates the waveform of the clock signal input to the PLL circuit.

As indicated by the solid line of FIG. 18(*c*), the image signal output from the CCD driven according to this distorted clock signal of FIG. 18(*b*) has noises that are synchronized with SSCG modulation. The output image signal of FIG. 18(*b*) further has distortion due to the distorted output signal of the VCO. In FIG. 18(*c*), the dotted line indicates the waveform of the output signal, which is not distorted.

The circuit disclosed in Japanese Patent Application Publication No. 2008-118366 generates a correction signal having an inversed phase with respect to the phase of the analog image signal output from the CCD based on the clock signal of FIG. 18(*b*). This correction signal is used to correct the noises that are superimposed on the image signal indicated by the solid line of FIG. 18(*c*).

SUMMARY

The circuit disclosed in Japanese Patent Application Publication No. 2008-118366 may, however, cause the corrected image signal to be further distorted, as the correction signal, which is transmitted in the form of analog waveform, may be further distorted due to noises in transmission line or frequency characteristics. More specifically, when the correction signal that is generated based on the clock signal of FIG. 18(*b*) is distorted, the waveform of the correction signal would be different from the waveform of the image signal subjected for correction, such that noises may not be removed from the image signal.

In view of the above, one aspect of the present invention is to provide a technique of removing noises that may be superimposed on an image signal due to SSCG modulation, thus allowing an image reading device to output an image signal that is free from such noises.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a schematic block diagram illustrating a circuit structure of a sensor board of the image reading device of FIG. 1;

Figure 1:
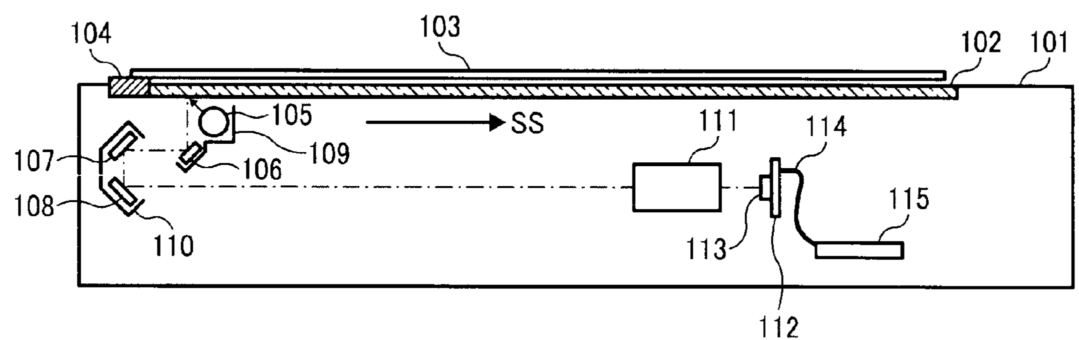
FIG. 1 is a schematic block diagram illustrating a structure of an image reading device, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms “a”, “an” and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to FIG. 1, a structure of an image reading device is explained according to an example embodiment of the present invention. The image reading device of FIG. 1 includes a housing 101, an exposure glass 102, a reference whiteboard 104, a light source 105, a first mirror 106, a second mirror 107, a third mirror 108, a lens 111, a sensor board 112, a CCD (charged coupled device) line image sensor 113, and a control board 115.

The exposure glass 102 is provided on the upper surface of the housing 101 of the image reading device to hold an original document 103 thereon. The original document 103 is pressed against the surface of the exposure glass 102 by a pressure plate. The reference whiteboard 104 is disposed at an image reading start position, which is the left in FIG. 1, of the exposure glass 102, and is used for obtaining a reference image for shading correction.

The light source 105, which is implemented by a lamp, irradiates light toward the image surface of the original document 103. The reflected light reflected from the original document 103 is reflected toward the first mirror 106, the second mirror 107, and the third mirror 108, toward the lens 111. The lens 111 focuses the reflected light toward the CCD line image sensor 113, which is provided on the sensor board 112, to form an optical image thereon.

The light source 105 and the first mirror 106 are incorporated in a first carriage 109, which moves in the sub-scanning direction SS. The second mirror 107 and the third mirror 108 are incorporated in a second carriage 110, which moves in the sub-scanning direction SS. The second carriage 110 moves at a scanning speed that is half of the scanning speed of the first carriage 109 so as to keep the optical path length between the exposure glass 102 and the CCD line image sensor 113 substantially the same.

The sensor board 112 drives the CCD line image sensor 113. The CCD line image sensor 113 generates an image signal (analog image signal) based on a received light level of each pixel of the optical image. The sensor board 112 processes the image signal using an image processing integrated circuit (IC) such as an analog front end (AFE) circuit 124 (FIG. 2), and outputs the processed digital image signal to the control board 115 through a signal line 114. The sensor board 112 receives a control signal from a central processing unit (CPU) of the control board 115 through the signal line 114.

The control board 115 includes an image processing unit and the CPU. The control board 115 applies various image processing to the digital image signal to generate image data for output using the image processing unit, which operates under control of the CPU. The control board 115 further controls operation of the sensor board 112 using the CPU.

Figure 3:
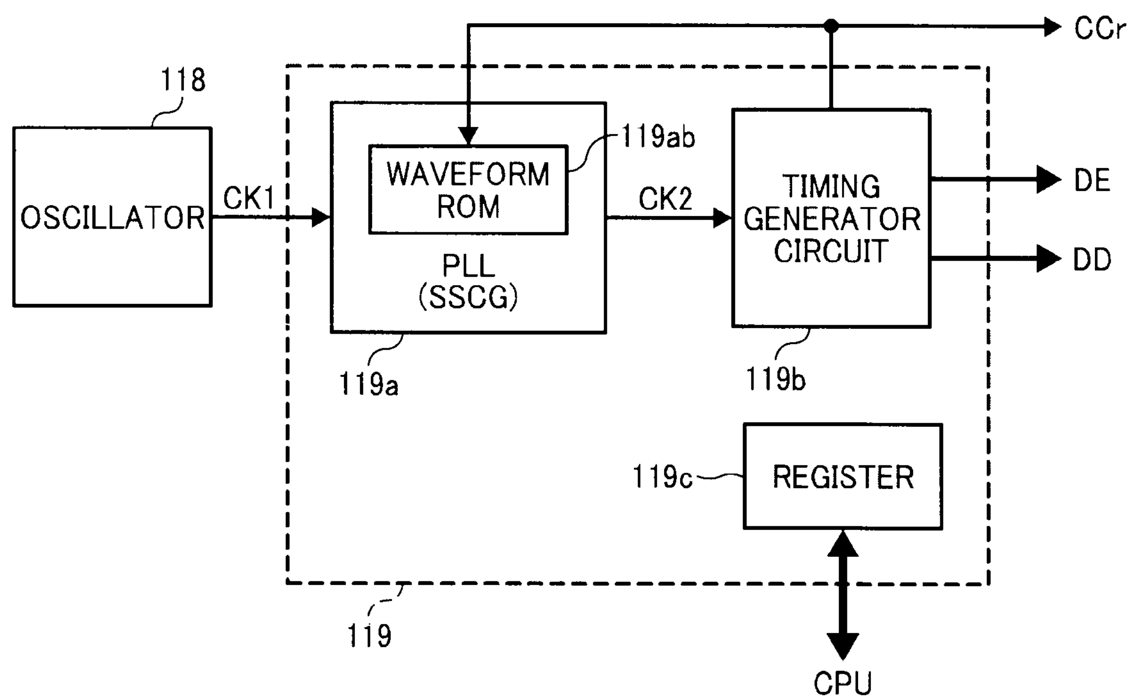
FIG. 3 is a schematic block diagram illustrating a structure of a timing generator in the sensor board of FIG. 2.
Figure 4:
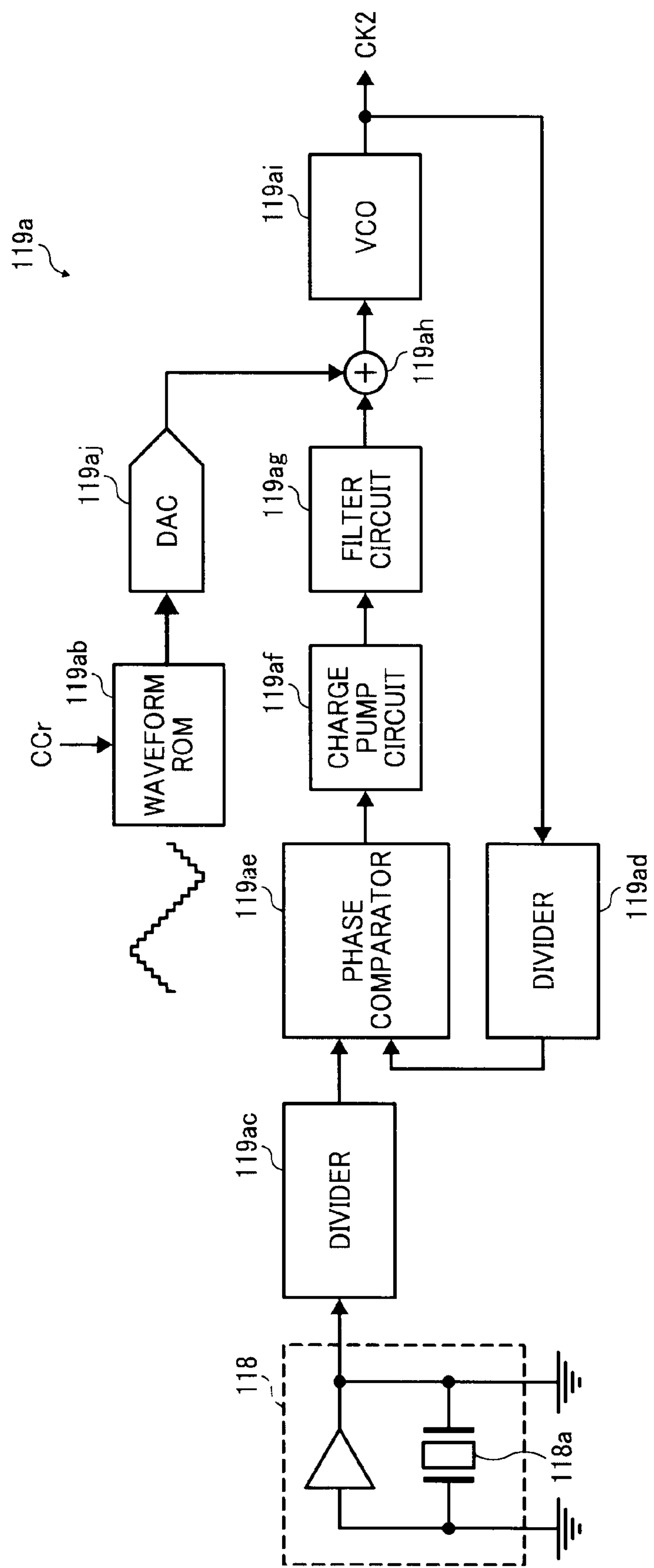
FIG. 4 is a schematic block diagram illustrating a circuit structure of a PLL circuit in the timing generator of FIG. 3.

FIG. 2 illustrates an example structure of the sensor board 112 of the image reading device of FIG. 1. FIG. 3 is an example structure of a timing generator 119 of the sensor board 112. FIG. 4 is an example structure of a PLL circuit 119*a* of the timing generator 119. In each figure, the thin line indicates a signal line of an analog signal, and the thick line indicates a signal line of a digital signal.

Referring to FIGS. 2 and 3, an oscillator 118 outputs a reference clock signal CK1 to the timing generator (TG) 119. As illustrated in FIG. 3, the timing generator 119 includes the PLL circuit 119*a* provided with a SSCG circuit, a timing generator circuit 119*b*, and a register 119*c*. The PLL circuit 119*a* spreads frequencies of the input reference clock signal CK1 using the SSCG circuit to generate a second clock signal CK2 having a desired frequency.

Based on the second clock signal CK2 received from the PLL circuit 119*a*, the timing generator circuit 119*b* generates a CCD drive signal "DD" for driving the CCD line image sensor 113, an AFE drive signal "DE" for driving the AFE 124 described below referring to FIG. 2, and a reading clock signal "CCr" to be supplied to a waveform ROM 119*ab* of the PLL circuit 119*a* and a waveform memory 124A of the AFE 124 (FIG. 2).

The PLL circuit 119*a* is provided with the waveform ROM 119*ab*, which stores digital data that forms a triangle waveform ("triangle waveform data") as modulation profile data to be used for SSCG modulation. Upon receiving the reading clock signal CCr output from the timing generator circuit 119*b*, the digital data for forming the triangle waveform is sequentially read out from the ROM 119*ab*. The register 119*c* stores various data for controlling operation or operation state of various parts of the timing generator 119. The CPU of the control board 115 accesses these data stored in the register 119*c*.

Referring to FIG. 4, a structure of the PLL circuit 119*a* is explained. The oscillator 118 is a crystal oscillator having a crystal oscillating element 118*a*. The PLL circuit 119*a* includes a frequency divider 119*ac*, a frequency divider 119*ad*, and a phase comparator 119*ae*. The frequency divider 119*ac* divides the first clock signal CK1, which is the reference clock signal, output from the oscillator 118 by a predetermined division ratio. The frequency divider 119*ad* divides the second clock signal CK2 output from the PLL circuit 119*a* by a predetermined division ratio. The phase comparator 119*ae* compares the phase between the output of the frequency divider 119*ac* and the output of the frequency divider 119*ad*.

The PLL circuit 119*a* further includes a charge pump circuit 119*af*, a filter circuit 119*ag*, a digital analog converter (DAC) 119*aj*, and a voltage control oscillator (VCO) 119*ai*. The charge pump circuit 119*af* outputs an electrical current having the value that is generated based on the comparison result of the phase comparator 119*ae*. The filter circuit 119*ag*, which is a loop filter, converts the current output from the charge pump circuit 119*af* to a voltage through integration, while removing the noises from the output of the charge pump circuit 119*af*.

The DAC 119*aj* converts the triangle waveform data read out from the waveform ROM 119*ab* into an analog signal. The adder circuit 119*ah* adds the analog signal of the triangle waveform data that is output from the DAC 119*aj* with the output of the filter circuit 119*ag* to output the analog signal, which is the voltage signal. The voltage signal controls the oscillating frequency of the VCO 119*ai* to cause the VCO 119*ai* to output an oscillating output signal as the second clock signal CK2.

As described above, the output voltage of the filter circuit 119*ag* is periodically changed according to the profile (triangle waveform) of the SSCG modulation output from the waveform ROM 119*ab* through the adder circuit 119*ah*, thus making the second clock signal CK2 output from the VCO 119*ai* to be SSCG modulated.

The modulation period for this SSCG modulation is determined based on a number of samples of the triangle waveform data stored in the waveform ROM 119*ab* for one period, and the frequency value of the reading clock signal CCr used for reading the triangle waveform data from the waveform ROM 119*ab*. The depth of modulation for the SSCG modulation, which is the degree of modulation of frequency, is adjusted through changing the amplitude of the triangle waveform data stored in the waveform ROM 119*ab*.

The division ratio of the frequency dividers 119*ac* and 119*ad* may be set, for example, by an external CPU such as the CPU of the control board 115. Through the CPU, the frequency of the second clock signal CK2 output from the PLL circuit 119*a* may be adjusted.

Referring back to FIG. 2, the CCD line image sensor 113, which is driven by the CCD drive signal DD output from the timing generator (TG) 119, converts an optical image of the original document 103 (FIG. 1) into an analog image signal. The image signal reflects the light level indicating the lightness or darkness of each pixel in the optical image. The analog image signal output from the CCD line image sensor 113 is output to the AFE 124 through an EF (emitter follower) circuit 121 and an AC condenser 122. In this example, the CCD line image sensor 113 is provided with a function of reading a RGB full color image. The CCD line image sensor 113 outputs the analog image signal of each color components of red (R), green (G), and blue (B) of the read image data through two channels: a channel through which a signal of odd pixels is sequentially output; and a channel through which a signal of even pixels is sequentially output.

More specifically, for the analog image signal of red components, the CCD line image sensor 113 sequentially outputs the signal of odd pixels as PRo, and the signal of even pixels as PRe. For the analog image signal of green components, the CCD line image sensor 113 sequentially outputs the signal of odd pixels as PGo, and the signal of even pixels as PGe. For the analog image signal of blue components, the CCD line image sensor 113 sequentially outputs the signals of odd pixels as PBo, and the signals of even pixels as PBe.

The red component signals PRo and PRe are input through emitter follower (EF) circuits 121*a* and 121*b*, and alternating-current (AC) condensers 122*a* and 122*b*, to a R signal processor 124R of the AFE 124.

The green component signals PGo and PGe are input through EF circuits 121*c* and 121*d*, and AC condensers 122*c* and 122*d*, to a G signal processor 124G of the AFE 124.

The blue component signals PBo and PBe are input through EF circuits 121*e* and 121*f*, and AC condensers 122*e* and 122*f*, to a B signal processor 124B of the AFE 124.

The R signal processor 124R, G signal processor 124G, and B signal processor 124B each function as an image signal processing circuit having a channel for the odd pixels and a channel for the even pixels. Now, a structure of the R signal processor 124R is explained below with reference to FIG. 2. Since the image processors 124R, 124G, and 124B are common in structure, description for the image processors 124G and 124B are omitted. In addition to the image processors 124R, 124G, and 124B, the AFE 124 includes the waveform memory 124A, a register 124C, and an interface 124D. The waveform memory 124A stores therein correction waveform data used for removing noises that may be superimposed on the image signals due to SSCG modulation.

The R signal processor 124R includes clamp circuits 131, 137, sample hold (S/H) circuits 132 and 138, programmable gain amplifier (PGA) circuits 133 and 139, A/D converters (ADC) 134 and 140, adder circuits 135 and 141, multiplier/inverter circuits 136 and 142, and a multiplexer 143. The condensers 122*a* and 122*b* are each input with the signals PRo and PRe by alternate circuit. The multiplexer 143 outputs any one of the outputs from the adder circuits 135 and 141 to the interface 124D. In this example, the AFE 124 includes the image signal processing circuit 124R, which is provided with the A/D converters 134 and 140 that converts the analog image signal output from the CCD line image sensor 113 to the digital image signal for output.

The clamp circuits 131 and 137 each clamp the input signals PRo and PRe to an internal reference voltage of the AFE 124 to restore direct current (DC). The S/H circuits 132 and 138 each sample the signals PRo and PRe with a sample pulse, which is one of the AFE drive signals DE, to be kept at a certain level such that continuous analog image signals are output. According to the amplifier control pulses of the AFE drive signals DE, the PGA 133 and 139 are operated to multiply the analog image signals with a predetermined amplification ratio. According to the A/D conversion pulses of the AFE drive signals DE, the ADC 134 and 140 are each operated to convert the multiplied analog image signals to multibit (such as 10 bit) image signals, and input the image signals to one of input terminals of the adder circuits 135 and 141.

In FIG. 2, the sample pulses of the AFE drive signals DE that are output from the timing generator 119 are input, respectively, to the S/H circuits 132 and 138 of the R signal processor 124R, the S/H circuits of the G signal processor 124B, and the S/H circuits of the B signal processor 124B at predetermined timings.

The multiplication control pulses of the AFE drive signals DE are input, respectively, to the PGAs 133 and 139 of the R signal processor 124R, the PGAs of the G signal processor 124G, and the PGAs of the B signal processor 124B, at predetermined timings.

The A/D conversion pulses of the AFE drive signals DE are input, respectively, to the ADCs 134 and 140 of the R signal processor 124R, the ADCs of the G signal processor 124G, and the ADCs of the B signal processor 124B, at predetermined timings.

The correction waveform data read out from the waveform memory 124A are input, respectively, to the multiplier/inverter circuits 136 and 142 of the R signal processor 124R, the multiplier/inverter circuits of the G signal processor 124G, and the multiplier/inverter circuits of the B signal processor 124B.

The adder circuits 135 and 141 each have another input terminal to which the signals output from the multiplier/inverter circuits 136 and 142 are respectively input. The multiplier/inverter circuits 136 and 142 are each input with the correction waveform data read out from the waveform memory 124A in synchronization with the reading clock signal CCr, multiples the correction waveform data values with a specific multiplication coefficient to generate a multiplied result. The multiplied result is inverted or not inverted according to the specific phase state.

The signals output from the multiplier/inverter circuits 136 and 142 correspond to correction signals, or correction digital signals, to be used for removing noises due to SSCG modulation from the digital image signals. The multiplication coefficient values and information regarding the phase for determining whether to invert or not invert, which are used by the multiplier/inverter circuits 136 and 142, are stored in the register 124C. The CPU of the control board 115 of FIG. 1 accesses data stored in the register 124C. More specifically, the CPU of the control board 115 sets various data, such as the multiplication coefficient values and information regarding the phase for determining whether to invert or not invert, as described below.

The adder circuit 135 adds the red component digital image signal of odd pixels that is output from the ADC 134, with the correction digital signal output from the multiplier/inverter circuit 136, and outputs the added result as a 10 bit digital image signal to the multiplexer 143. The adder circuit 141 adds the red component digital image signal of even pixels that is output from the ADC 140, with the correction digital signal output from the multiplier/inverter circuit 142, and outputs the added result as a 10 bit digital image signal to the multiplexer 143.

The multiplexer 143 alternately outputs the digital image signal of odd pixels that is output from the adder circuit 135, and the digital image signal of even pixels that is output from the adder circuit 141. More specifically, the multiplexer 143 alternates the digital image signal output through the channel for the signal of odd pixels, and the digital image signal output through the channel for the signal of even pixels to form a 10 bit digital image signal that corresponds to a red component image pixel for one scanning line. The 10 bit digital image signal is output through the interface 124D to the image processing unit ("image processing device") of the control board 115, and to a peak bottom detection circuit 125.

In a substantially similar manner as described above referring to FIG. 2, the G signal processor 124G generates a 10 bit digital image signal that corresponds to a green component image pixel for one scanning line, and outputs the image signal through the interface 124D to the image processing unit and a peak bottom detection circuit 126.

In a substantially similar manner as described above referring to FIG. 2, the B signal processor 124B generates a 10 bit digital image signal that corresponds to a blue component image pixel of one scanning line, and outputs the image signal through the interface 124D to the image processing unit and a peak bottom detection circuit 127.

Now, removal of noises due to SSCG modulation is explained.

The correction waveform data stored in the waveform memory 124A of FIG. 2 is obtained by driving the CCD line image sensor 113 under the dark conditions according to the CCD drive signal DD to cause the CCD line image sensor 113 to output the read digital image signal, and measuring the read digital image signal output from the CCD line image sensor 113.

The multiplier/inverter circuits 136 and 142 each adjust the correction waveform data read out from the waveform memory 124A such that the correction waveform data of the waveform memory 124A and noises in the digital image signal obtained by reading an original image are the same in amplitude, but have phrases that are inverted from each other. The adder circuits 135 and 141 further add the adjusted correction waveform data to remove noises due to SSCG modulation from the digital image signal.

Figure 5:
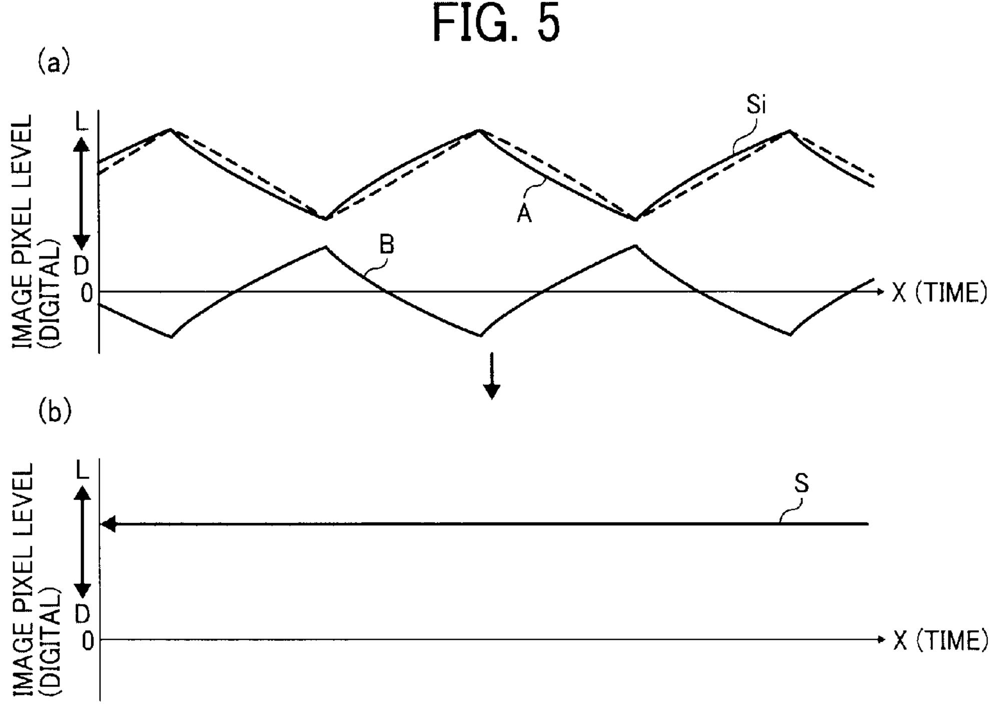
FIG. 5 is a timing chart illustrating an image signal having noises due to SSCG modulation, a correction signal, and a corrected signal from which the noises due to SSCG modulation are removed using the correction signal, according to an example embodiment of the present invention.

For example, assuming that the R signal processor 124R alternates the digital image signals respectively output from the ADC 134 and 140 to generate the digital image signal for one scanning line, the digital image signals output from the ADC 134 and 140 are superimposed with noises due to SSCG modulation, as indicated by the waveform A of the signal Si illustrated in FIG. 5(*a*). Unless such noises are removed, the digital image signal Si having the noises due to SSCG modulation will be output.

Through controlling the waveform memory 124A, the multiplier/inverter circuits 136 and 142, and the adder circuits 135 and 141, the noises due to SSCG modulation that are superimposed on the digital image signal are removed using the correction waveform data read out from the waveform memory 124A. More specifically, referring to FIG. 5, the image signal Si having the waveform A of FIG. 5(*a*) is added with the correction signal having the waveform B of FIG. 5(*a*) to generate the corrected image signal S of FIG. 5(*b*). The correction waveform data is read out from the waveform memory 124A at a predetermined time, which is specified by the reading clock signal CCr that is used for reading out the triangle waveform data from the waveform ROM 119*ab* of the PLL circuit 119*a* (FIG. 3). Accordingly, the amplitude of the correction waveform data changes as the amplitude of the SSCG modulation changes. More specifically, the change in amplitude of the correction waveform data and the change in amplitude of SSCG modulation are associated with each other such that they change at predetermined timings. As described below, when measuring the samples of the correction waveform data, the correction waveform data is read at a timing that is associated with the change in amplitude of modulation profile of SSCG modulation.

The adder circuit 135 adds the digital image signal that corresponds to odd pixels of the image signal obtained by reading a white image or an image having a predetermined light level in the main scanning direction, to the corresponding correction digital signal, to output the resultant odd signal to the multiplexer 143. The adder circuit 141 adds the digital image signal that corresponds to even pixels of the image signal obtained by reading a white image or an image having a predetermined light level in the main scanning direction, to the corresponding correction digital signal, to output the resultant even signal to the multiplexer 143. The multiplexer 143 alternately outputs the odd signal and the even signal to output a digital image signal for one scanning line. As illustrated in FIG. 5(*b*), the corrected digital image signal S output from the multiplexer 143 is free from the noises due to SSCG modulation.

Figure 6:
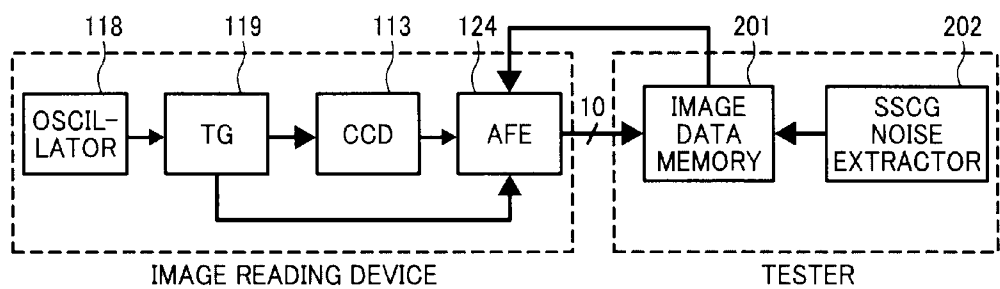
FIG. 6 is a schematic block diagram illustrating a section of a testing apparatus that measures an image signal output from the image reading device and generate correction waveform data based on the measured image signal.

Referring now to FIG. 6, measuring the correction waveform data and storing it in the waveform memory 124A is explained. FIG. 6 illustrates an image reading device that is ready for shipping, and a testing device (tester) that is used for measuring correction waveform data. For the descriptive purposes, it is assumed that the image reading device of FIG. 6 is the same as the image reading device of FIG. 1.

Referring to FIG. 6, the testing device includes an image data memory 201, which stores a digital image signal output from the AFE 124 of the image reading device. The testing device includes a central processing unit (CPU), which causes the image reading device to perform reading a sample image to output a digital image signal of the sample image under the dark conditions. The CPU of the testing device further functions as a SSCG noise extractor 202. The SSCG noise extractor 202 stores the digital image signal output from the image reading device in the image data memory 201, and further stores the waveform data of the digital image signal in the waveform memory 124A of the AFE 124 of the image reading device as the correction waveform data.

As described above, in actual image signal correction operation, the correction waveform data will be read out from the waveform memory 124A according to the reading clock signal CCr. Accordingly, the SSCG noise extractor 202 extracts the reading clock signal CCr used by the image reading device, and samples the correction waveform data according to the extracted reading clock signal CCr. The SSCG noise extractor 202 further reads the correction waveform data in a manner that corresponds to the change in amplitude of modulation profile of SSCG modulation. This causes the amplitude of the correction waveform data to be changed as the amplitude of the modulation profile of SSCG modulation changes.

At the time of obtaining the samples of the correction waveform data, the light source 105 of the image reading device is turned off. For the red component image signal, the AFE 124 causes the R signal processor 124R to output the digital image signal to the testing device. The AFE 124 further prohibits the adder circuits 135 and 141 of the R image signal processor 124R from adding the outputs of the multiplier/inverter circuits 136 and 142 to the image signals respectively output from the ADCs 134 and 140. For the green and blue component image signals, the AFE 124 performs operation in a substantially similar manner as described above.

The correction waveform data is obtained by measuring the outputs of the image reading device using the testing device. Accordingly, the correction waveform data accurately reflects the influences on signal processing when the timing generator 119 and the AFE 124 are driven, such as distortion in waveform of the signal caused due to signal transmission. Since a digital image signal output from the image reading device is corrected using the correction waveform data that is obtained by measuring the samples of a digital image signal output from the image reading device, noises that may be superimposed on the image signal can be effectively removed. As described above, the correction waveform data is read out from the waveform memory 124A according to the reading clock signal CCr. The multiplier/inverter circuits 136 and 142 each adjust the phase and amplitude of the correction waveform data. The adder circuits 135 and 141 each add the digital image signals with the adjusted correction waveform data.

Figure 7:
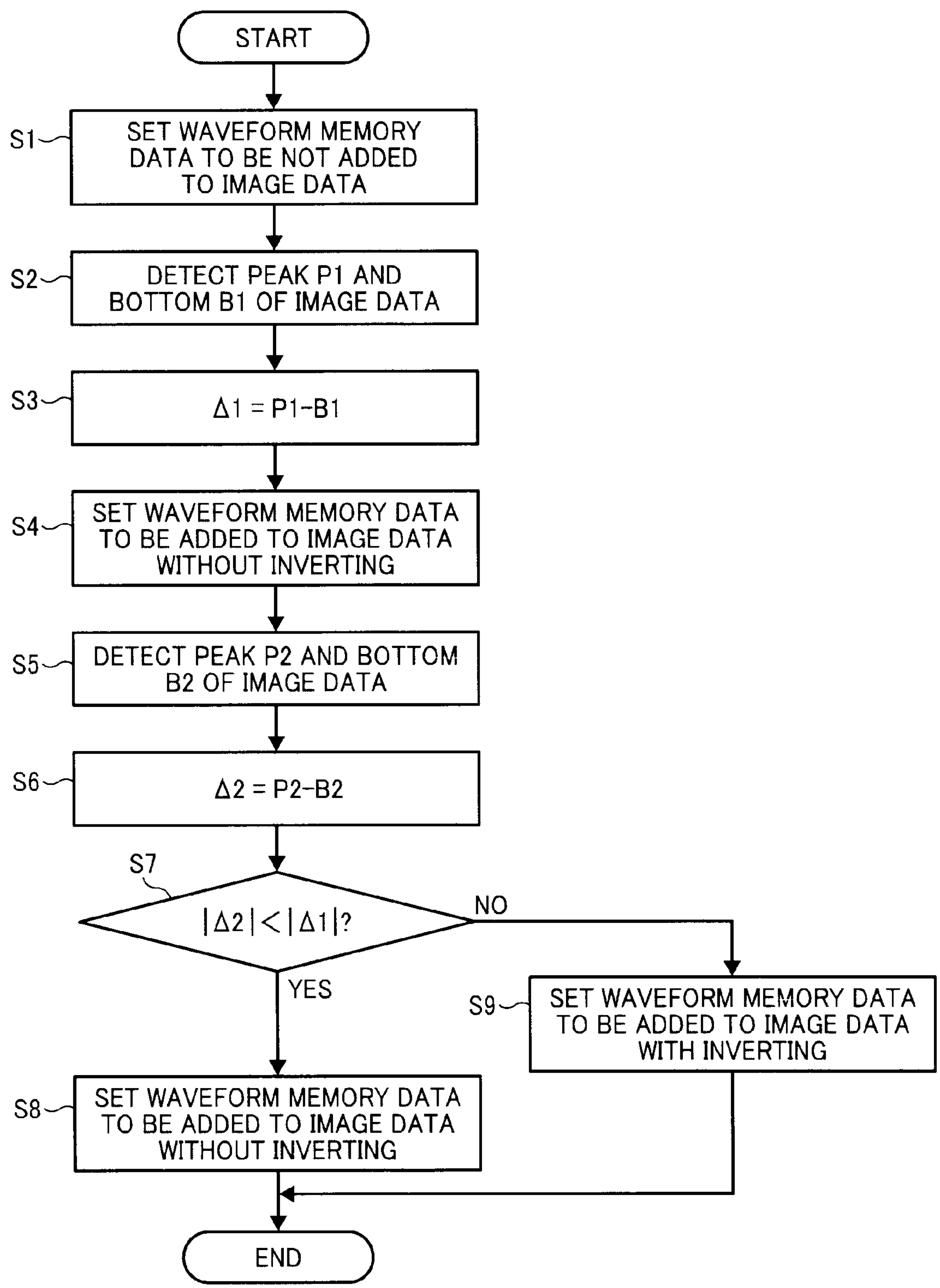
FIG. 7 is a flowchart illustrating operation of determining a phase of the correction waveform data, performed by a processor of the image reading device of FIG. 1.

Referring now to FIG. 7, determining the phase of the correction waveform data to be used by the multiplier/inverter circuits 136 and 142 is explained. The CPU of the control board 115 (FIG. 1) performs operation of FIG. 7 for each signal channel of the CCD line image sensor 113. More specifically, for each of the signals PRo, PRe, PGo, PGe, PBo, and PBe, the CPU performs operation of FIG. 7. For example, assuming that the phase is determined for the signal PRo, the CPU causes the multiplexer 143 (FIG. 2) to only select the adder circuit 135 to apply operation of FIG. 7 to the signal output from the adder circuit 135. Assuming that the phase is determined for the signal PRe, the CPU causes the multiplexer 143 to only select the adder circuit 141 to apply operation of FIG. 7 to the signal output from the adder circuit 141. For the descriptive purposes, the following explains the example case where the phase is determined for the signal PRo.

When the CPU of the control board 115 starts phase determination operation of FIG. 7, at S1, the CPU sets the adder circuit 135 such that the correction waveform data output from the multiplier/inverter circuit 136 is not added to the image data, i.e., the image signal.

At S2, the CPU causes the image reading device to perform reading an original image to output an image signal for one scanning line, while turning off the light source 105 of FIG. 1. At this time, the CPU obtains the peak value P1 and the bottom value B1 of the image signal, which are respectively detected by the peak bottom detection circuit 125 (FIG. 2).

At S3, the CPU calculates a difference Δ1 between the peak value P1 and the bottom value B1, by subtracting B1 from P1.

At S4, the CPU sets the multiplication coefficient of the multiplier/inverter circuit 136 to a predetermined value such as 1.0, and the correction waveform data to be not inverted. The CPU further sets the adder circuit 135 to add the correction waveform data output from the multiplier/inverter circuit 136.

At S5, the CPU causes the image reading device to read one scanning line of the original image, with the light source 105 being turned off. The CPU obtains the peak value P2 and the bottom value B2 of the image signal, which are respectively detected by the peak bottom detection circuit 125.

At S6, the CPU calculates the difference Δ2 between the peak value P2 and the bottom value B2 by subtracting the bottom value B2 from the peak value P2.

At S7, the CPU determines whether the absolute value of the difference Δ2 is less than the absolute value of the difference Δ1. When it is determined that the absolute value of the difference Δ2 is less than the absolute value of the difference Δ1 ("YES" at S7), the CPU determines that correcting the digital image signal with the correction waveform data without being inverted can effectively reduce the influences by the SSCG modulation noises from the digital image signal, when compared with the case where no correction is performed. Accordingly, the operation proceeds to S8.

At S8, the CPU sets the phase set value of the multiplier/inverter 136 such that the multiplier/inverter 136 outputs the value of the output data of the waveform memory 124A in the non-inverted state to the adder circuit 135. The phase set value of the multiplier/inverter 136 is written in the register 124C, and the operation ends.

When it is determined that the absolute value of the difference Δ2 is equal to or greater than the absolute value of the difference Δ1 ("NO" at S7), the CPU determines that correcting the digital image signal with the correction waveform data without being inverted cannot effectively reduce the influences by the SSCG modulation noises from the digital image signal, when compared with the case where no correction is performed. Accordingly, the operation proceeds to S9.

At S9, the CPU sets the phase set value of the multiplier/inverter 136 such that the multiplier/inverter 136 outputs the value of the output data of the waveform memory 124A in the inverted state to the adder circuit 135. The phase set value of the multiplier/inverter 136 is written in the register 124C, and the operation ends.

As described above, the CPU determines information indicating whether to invert or not invert the phase of the correction waveform data to be added by the adder circuit, based on the difference Δ1 between the peak value and the bottom value of the image signal that is obtained by not adding the correction waveform data to the image signal, and the difference Δ2 between the peak value and the bottom value of the image signal that is obtained by adding the correction waveform data in the non-inverted state to the image signal.

Figure 8:
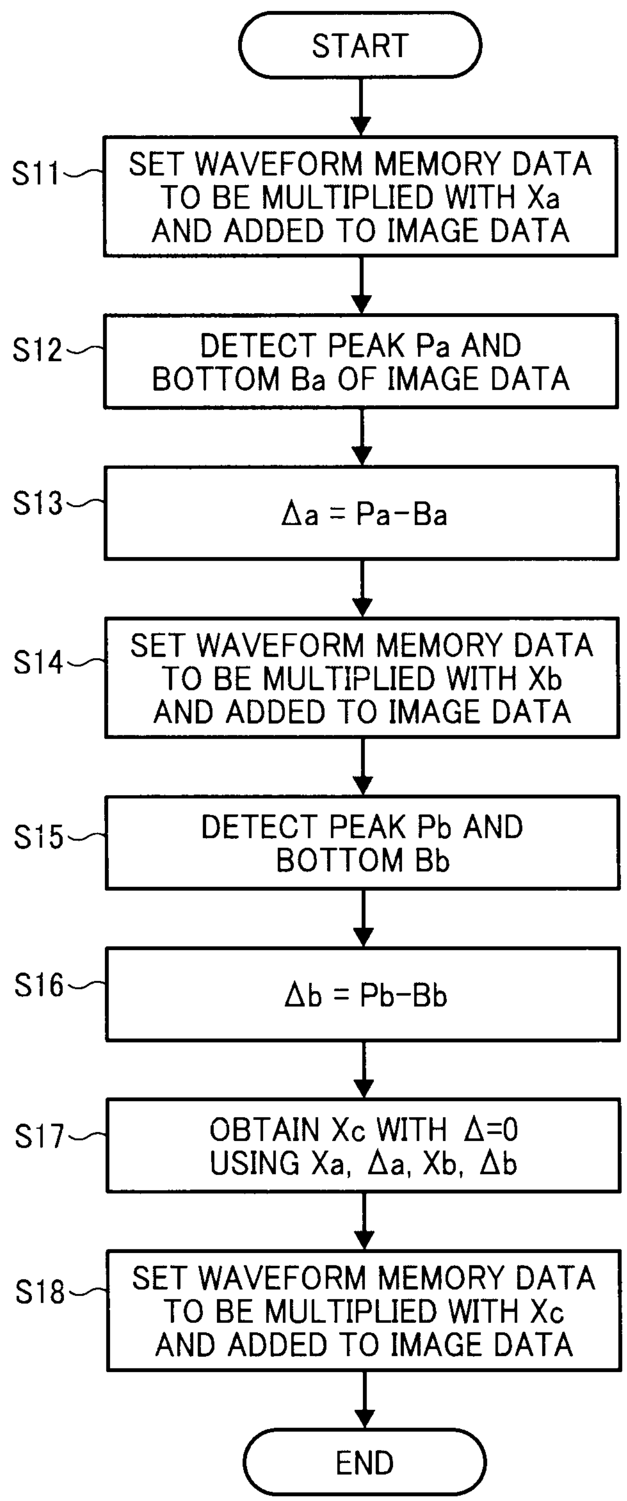
FIG. 8 is a flowchart illustrating operation of determining a multiplication coefficient to be multiplied with the correction waveform data, performed by the processor of the image reading device of FIG. 1.

Referring now to FIG. 8, operation of determining the multiplication coefficient of the multiplier/inverter circuit is explained. The CPU of the control board 115 performs operation of FIG. 8 for each signal channel of the CCD line image sensor 113. More specifically, for each of the signals PRo, PRe, PGo, PGe, PBo, and PBe, the CPU performs operation of FIG. 8. For the descriptive purposes, however, the following explains the example case where the multiplication coefficient is determined for the signal PRo. Further, in the following example, it is assumed that the CPU determines that the phase set value of the multiplier/inverter circuit 136 is set such that the multiplier/inverter circuit 136 outputs the output data of the waveform memory 124A in the inverted state to the adder circuit 135.

When the CPU of the control board 115 starts multiplication value determination operation of FIG. 8, at S11, the CPU sets the multiplication coefficient of the multiplier/inverter circuit 136 to an arbitrary number, Xa. The CPU further sets the adder circuit 135 to cause the adder circuit 135 to add the output of the multiplier/inverter circuit 136. More specifically, the adder circuit 135 is caused to add the image data output from the ADC 134 with the multiplied value of the correction waveform data output from the multiplier/inverter circuit 136 and the multiplication coefficient Xa.

At S12, the CPU causes the image reading device to perform reading an original image to output an image signal for one scanning line, while turning off the light source 105 of FIG. 1. At this time, the CPU obtains the peak value Pa and the bottom value Ba of the image signal, which are respectively detected by the peak bottom detection circuit 125 (FIG. 2).

At S13, the CPU calculates a difference Δa between the peak value Pa and the bottom value Ba, by subtracting Ba from Pa.

At S14, the CPU sets the multiplication coefficient of the multiplier/inverter 136 to an arbitrary number, such as Xb. For example, Xb may be set greater than Xa. The CPU further sets the adder circuit 135 to add the correction waveform data output from the multiplier/inverter circuit 136. More specifically, the adder circuit 135 is caused to add the image data output from the ADC 134 with the multiplied value of the correction waveform data output from the multiplier/inverter circuit 136 and the multiplication coefficient Xb.

At S15, the CPU causes the image reading device to read one scanning line of the original image to output an image signal, with the light source 105 being turned off. The CPU obtains the peak value Pb and the bottom value Bb of the read image signal, which are respectively detected by the peak bottom detection circuit 125.

At S16, the CPU calculates the difference Ab between the peak value Pb and the bottom value Bb by subtracting the bottom value Bb from the peak value Pb.

At S17, the CPU calculates a multiplication coefficient Xc, which causes the difference Δ between the peak value and the bottom value to be 0, based on the relationship between the multiplication coefficient Xa and the difference Δa, and the relationship between the multiplication coefficient Xb and the difference Δb.

At S18, the CPU writes the calculated value of the multiplication coefficient Xc in the register 124C as the multiplication coefficient of the multiplier/inverter circuit 136. The CPU sets the multiplier/inverter 136 such that the multiplier/inverter 136 adds the image data with a value of the correction waveform data multiplied with the multiplication coefficient Xc, and the operation ends.

As described above, the CPU obtains the difference Aa between the peak value and the bottom value of the image signal with the multiplication coefficient of Xa, and the difference Δb between the peak value and the bottom value of the image signal with the multiplication coefficient of Xb. Using the values Xa, Aa, Xb, and Ab, the CPU obtains the multiplication coefficient Xc that makes the difference Δ between the peak value and the bottom value of the image signal to be 0.

Figure 9:
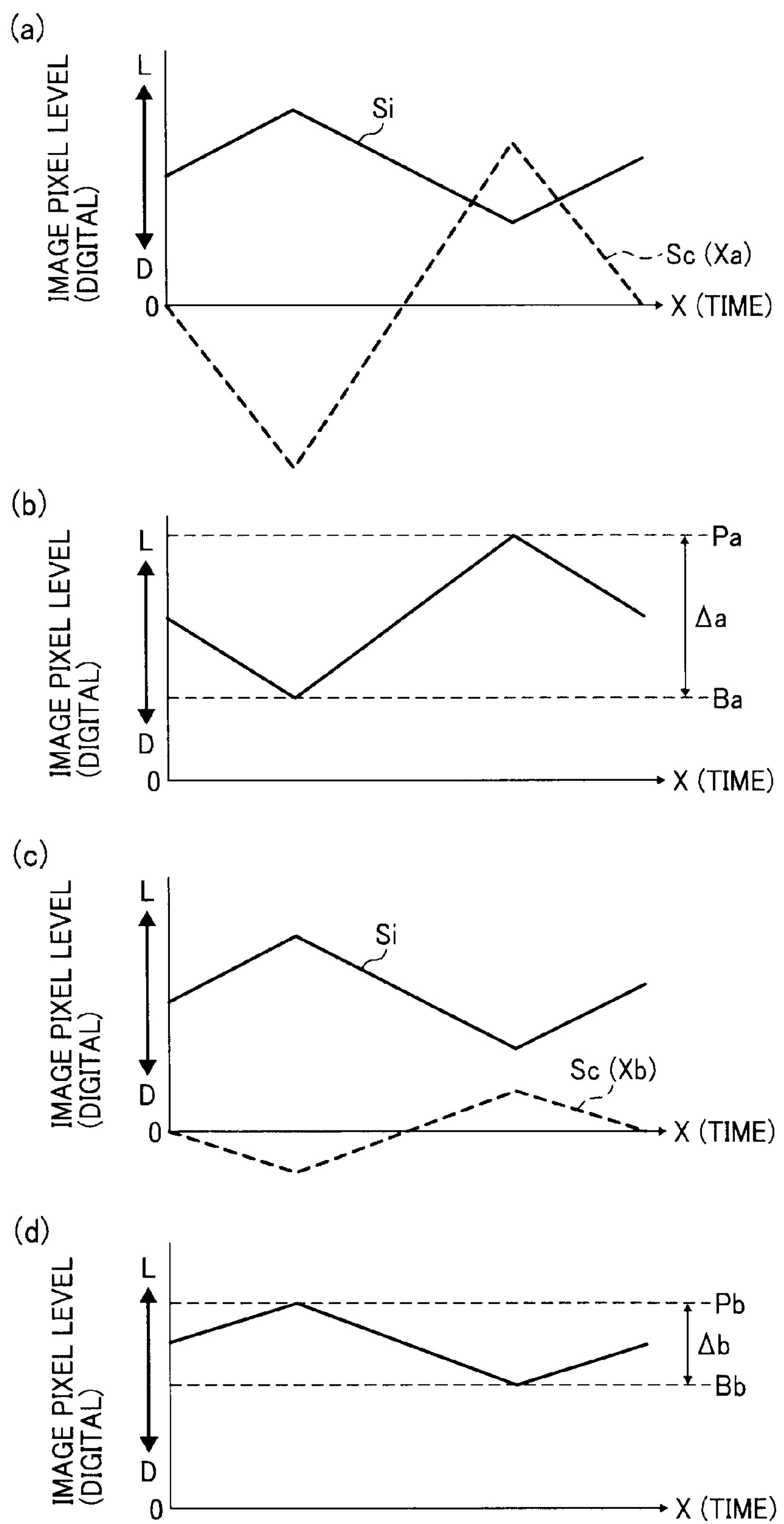
FIGS. 9 and 10 are graphs illustrating calculation of the multiplication coefficient.
Figure 10:
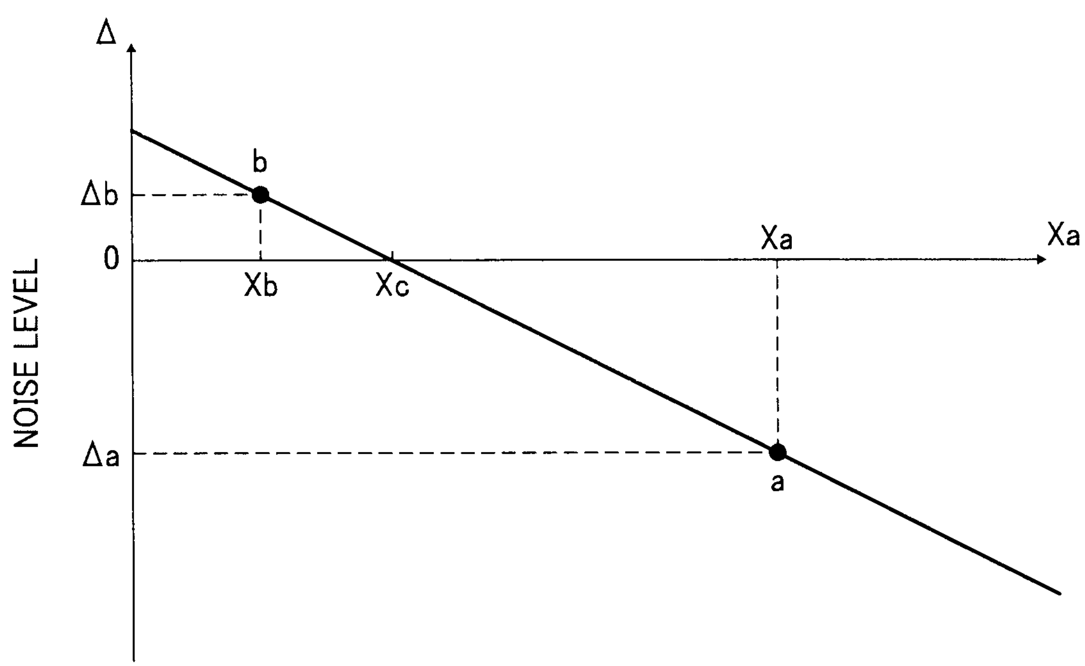

Referring now to FIGS. 9 and 10, calculation of multiplication coefficient Xc, performed at S17 of FIG. 8, is explained. In this example, it is assumed that the multiplication coefficient Xa and the multiplication coefficient Xb have the relationship expressed as Xa>Xb.

For example, assuming that the multiplication coefficient of the multiplier/inverter circuit 136 is set to Xa, the image pixel levels of the digital image signal Si for one scanning line change as indicated by the solid line of FIG. 9(*a*). The image pixel levels of the correction signal Sc output from the multiplier/inverter circuit 136 change as indicated by the dotted line of FIG. 9(*a*). The image pixel levels of the corrected image signal output from the adder circuit 135 by adding the image signal Si of FIG. 9(*a*) and the correction signal Sc of FIG. 9(*a*) change as indicated by the solid line of FIG. 9(*b*). The difference Δa between the peak value Pa and the bottom value Ba is indicated by the arrow in FIG. 9(*b*). The multiplier/inverter circuit 136 outputs the correction waveform data output from the waveform memory 124A in the inverted state to the adder circuit 135 as the correction signal Sc. As illustrated in FIG. 9(*b*), the corrected image signal output from the adder circuit is inverted, as compared to the image data signal Si, when the amplitude of the correction signal Sc is greater than the amplitude of the image signal Si.

Assuming that the multiplication coefficient of the multiplier/inverter circuit 136 is set to Xb, the image pixel levels of the digital image signal Si for one scanning line change as indicated by the solid line of FIG. 9(*c*). The image pixel levels of the correction signal Sc output from the multiplier/inverter circuit 136 change as indicated by the dotted line of FIG. 9(*c*). The image pixel levels of the corrected image signal output from the adder circuit 135 by adding the image signal Si and the correction signal Sc change as indicated by the solid line of FIG. 9(*d*). The difference Ab between the peak value Pb and the bottom value Bb is indicated by the arrows in FIG. 9(*d*). As illustrated in FIG. 9(*d*), the corrected image signal output from the adder circuit is not inverted, as compared to the image data signal Si, when the amplitude of the correction signal Sc is less than the amplitude of the image signal Si. Based on comparison between FIG. 9(*b*) and FIG. 9(*d*), the absolute value of the difference Δb of FIG. 9(*d*) is less than the absolute value of the difference Δa of FIG. 9(*b*).

As illustrated in FIG. 10, the values of the difference Δ, that is, the noise level after adding the correction signal, are plotted in the vertical axis. The values of multiplication coefficient X are plotted in the horizontal axis. The point "a" where the difference Δa and the multiplication coefficient Xa intersect, and the point "b" where the difference Δb and the multiplication coefficient Xb intersect, are plotted. The straight line that intersects theses points "a" and "b" are obtained, which indicates that the difference Δ linearly changes with the change in multiplication coefficient X. On the straight line, the multiplication coefficient having the difference value of 0 is obtained as the multiplication coefficient Xc.

In the example described above referring to FIG. 2, in the R signal processor 124R of the AFE 124, the adder circuit 135 adds the output of the ADC 134 and the output of the multiplier/inverter circuit 136 based on the digital signals. In a substantially similar manner, the adder circuit 141 adds the output of the ADC 140 and the output of the multiplier/inverter circuit 142 based on the digital signals. Alternatively, addition may be performed on the analog signals, for example, using a structure of the sensor board 112 of FIG. 11.

Figure 11:
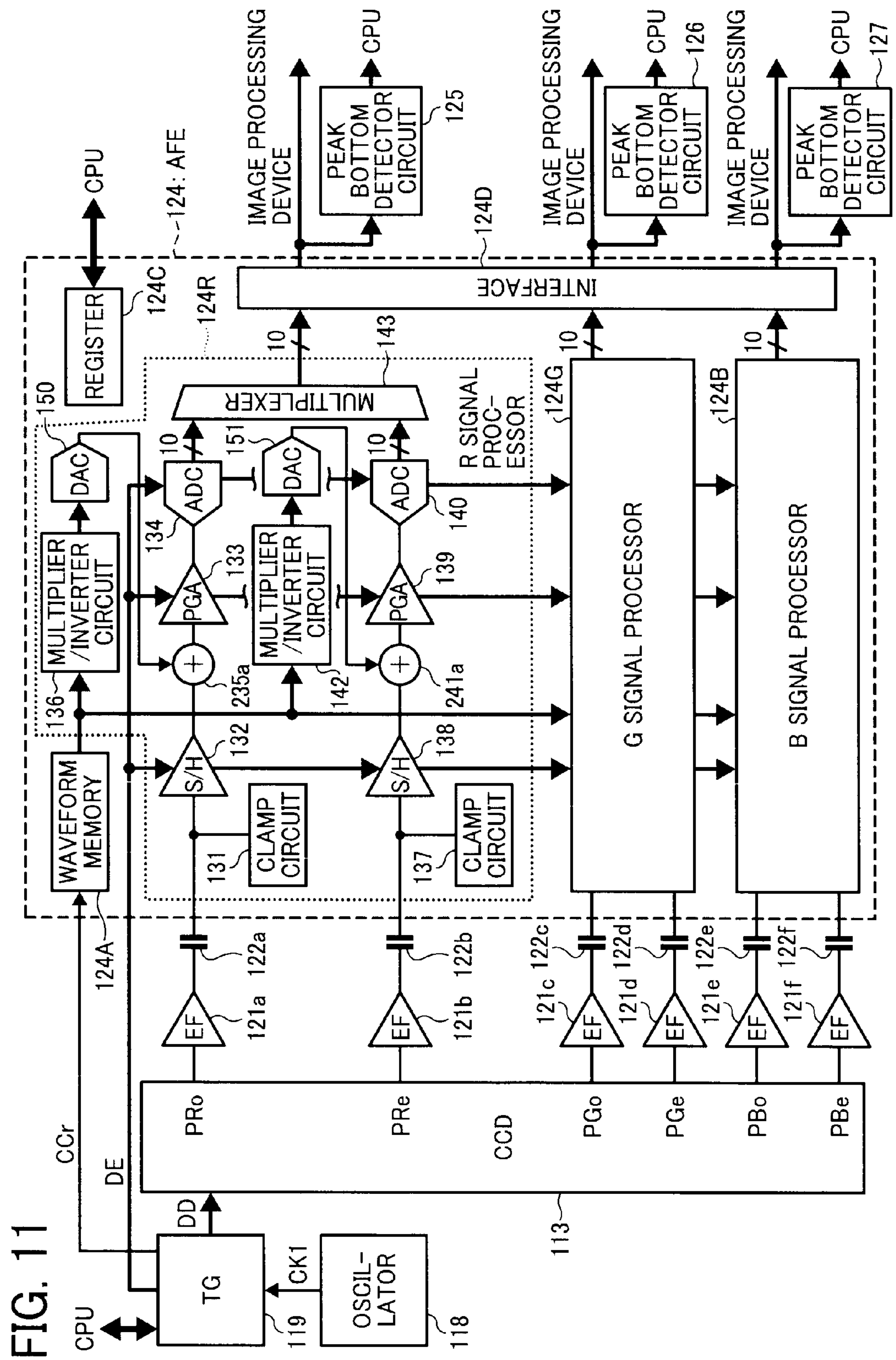
FIG. 11 is a schematic block diagram illustrating a circuit structure of a sensor board of the image reading device of FIG. 1, according to an example embodiment of the present invention.

FIG. 11 illustrates a circuit structure of the sensor board 112 according to another example embodiment of the present invention. The circuit structure of FIG. 11 is substantially similar to the circuit structure of FIG. 2, except for the addition of adder circuits 235*a* and 241*a* and DACs 150 and 151.

Referring to FIG. 11, the output signals from the S/H circuits 132 and 138 are respectively input to the adder circuits 235*a* and 241*a*. The DACs 150 and 151 respectively convert the signals output from the multiplier/inverter circuits 136 and 142 to analog signals, and output the converted analog signals to the adder circuits 235*a* and 241*a*. The adder circuits 235*a* and 241*a* each add the input analog signals with the analog image signals before being input to the ADCs 134 and 140, and removes the noises from the analog image signals. The PGAs 133 and 139 each amplify the output signals of the adder circuits 235*a* and 241*a*. The ADCs 134 and 140 each convert the outputs of the PGAs 133 and 139 to digital image signals, and output the image signals to the multiplexer 143.

In this example, the multiplier/inverter circuits 136 and 142, the DACs 150 and 151, and the adder circuits 235*a* and 241*a* together perform the function of correcting image signals. The AFE 124 is implemented as a signal processing circuit, which includes the ADCs 134 and 140 each of which converts the analog image signal output from the CCD line image sensor 113 to the digital image signal. With this circuit structure shown in FIG. 11, the read analog image signal is added with the correction signal of the correction waveform data such that only one operational amplifier (adder) is needed to perform the functions of the adder circuits 235*a* and 241*a*, thus reducing the overall costs for the device.

Figure 12:
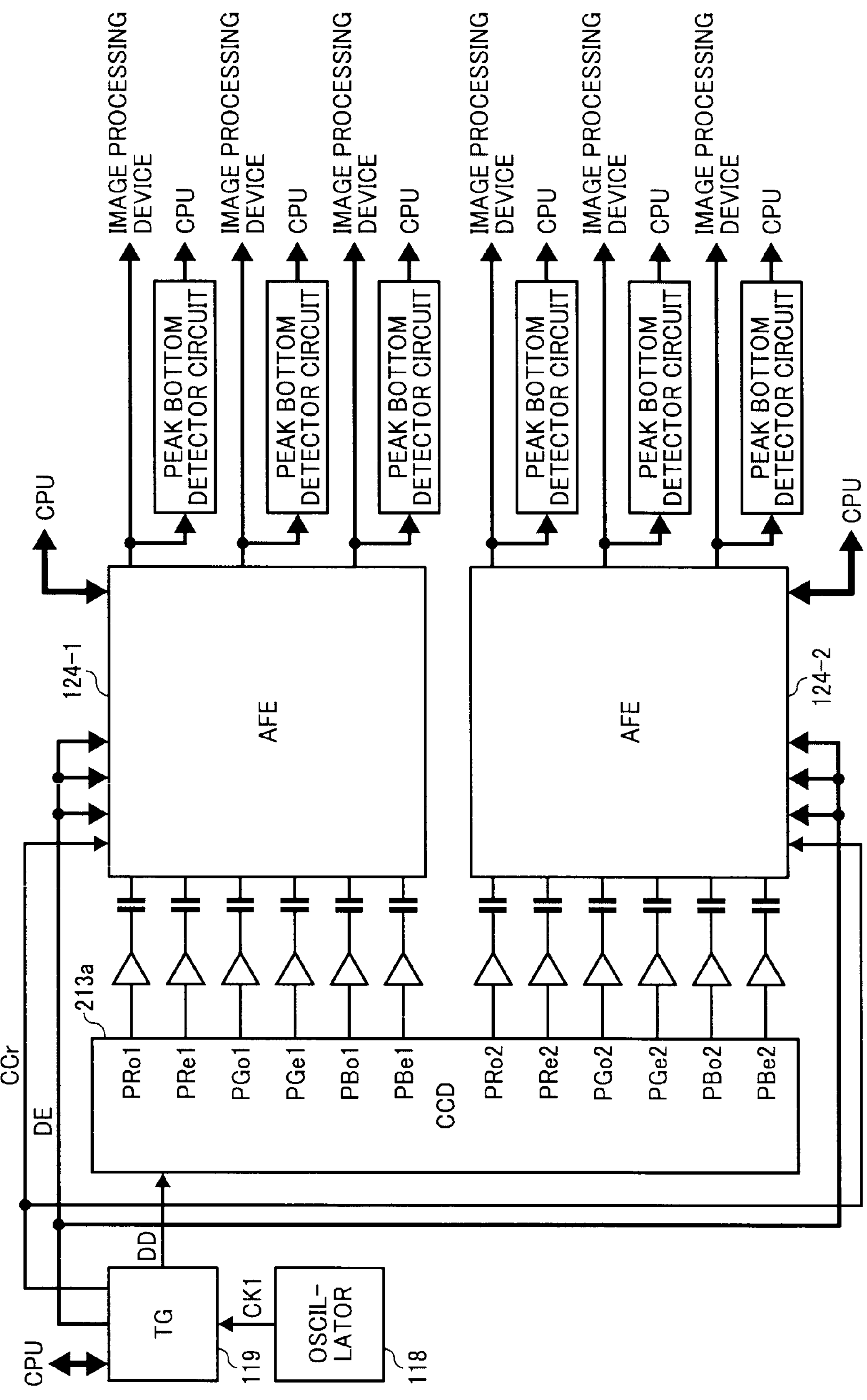
FIG. 12 is a schematic block diagram illustrating a circuit structure of a sensor board of the image reading device of FIG. 1, according to an example embodiment of the present invention.

FIG. 12 illustrates a structure of the sensor board 112, which includes a CCD line image sensor 213*a* in which four channels are provided for each one of R, G, and B colors. The sensor board 112 is provided with two AFEs 124-1 and 124-2. The AFE 124-1 processes signals PRo1, PRe1, PGo1, PGe1, PBo1, and PBe1, which are respectively output from the CCD line image sensor 213*a* through the channels. The AFE 124-2 processes signals PRo2, PRe2, PGo2, PGe2, PBo2, and PBe2, which are respectively output from the CCD line image sensor 213*a* through the channels.

The timing generator 119 supplies the AFE drive signal DE and the reading clock signal CCr, respectively, to the AFE124-1 and the AFE124-2. Since the timing generator 119 of FIG. 12 is substantially similar in function with the timing generator 119 of FIG. 2, the same reference numerals are assigned for the descriptive purposes. In FIG. 12, although the reference numerals of the emitter follower (EF) circuits, the AC condensers, and the peak bottom detection circuits are omitted, these are substantially similar in function and structure to the EF circuits 121*a* to 121*f*, the condensers 122*a* to 122*f*, and the peak bottom detection circuits 125 to 127 of FIG. 2.

The AFE 124-1 and AFE 124-2 are substantially similar in structure to the AFE 124 of FIG. 2 such that the waveform memory 124A is provided for each one of the AFEs. The testing device of FIG. 6 may be used to measure the correction waveform data for each one of the AFEs 124-1 and 124-2, and store the correction waveform data respectively in the waveform memory 124A of the AFE 124-1 and the waveform memory 124A of the AFE 124-2. In this example, the AFE 124-1 and the AFE 124-2 are each implemented by a signal processing circuit, which includes the ADC that converts the analog image signal output from the CCD line image sensor to the digital image signal.

The above-described technique of correcting the image signal, which is described referring to FIGS. 2 to 10 may be applied to a circuit provided with the CCD line image sensor having a large number of signal channels. In this example of FIG. 12, two AFEs are used to process image signals output from the CCD line image sensor. Alternatively, any desired number of AFEs may be used. Further, in this example, the timing generator 119 and the AFE 124 are each implemented by an integrated circuit such as ASIC. The signal processing circuit including the ADC may be implemented by an integrated circuit, which further includes a waveform memory, multiplier/inverter circuits, and adder circuits. In this manner, the signal processing circuit is implemented by the IC mounted on one chip.

Further, a structure, function, or operation of the image reading device is not limited to the above-described example. For example, the image reading device may be implemented as a monochrome image reading device that generates monochrome image data.

Further, in the above-described example, the CPU of the control board 115 controls operation of the sensor board 112. The control program that controls operation of the CPU may be previously stored in a memory of a computer system of the control board 115, such as ROM, HDD, or SSD. Alternatively, the control program may be stored in a recording medium such as CD-ROM, flexible disk, MO, CD-R, CD-RW, DVD+R, DVD+RW, DVD-R, DVD-RW, and DVD-RAM, or a nonvolatile memory such as SRAM, NOV-RAM, EEPROM, and memory card. The control program may be installed onto a general-purpose computer to cause the CPU to operate according to the control program. The CPU may load the control program from the memory onto its volatile memory to operate according to the control program. The control program stored in the recording medium or memory may be distributed while being stored in the recording medium or memory. Alternatively, the control program may be downloaded through a network from an external device that may be provided with a recording medium storing the control program therein or a memory storing the control program therein.

Figure 13:
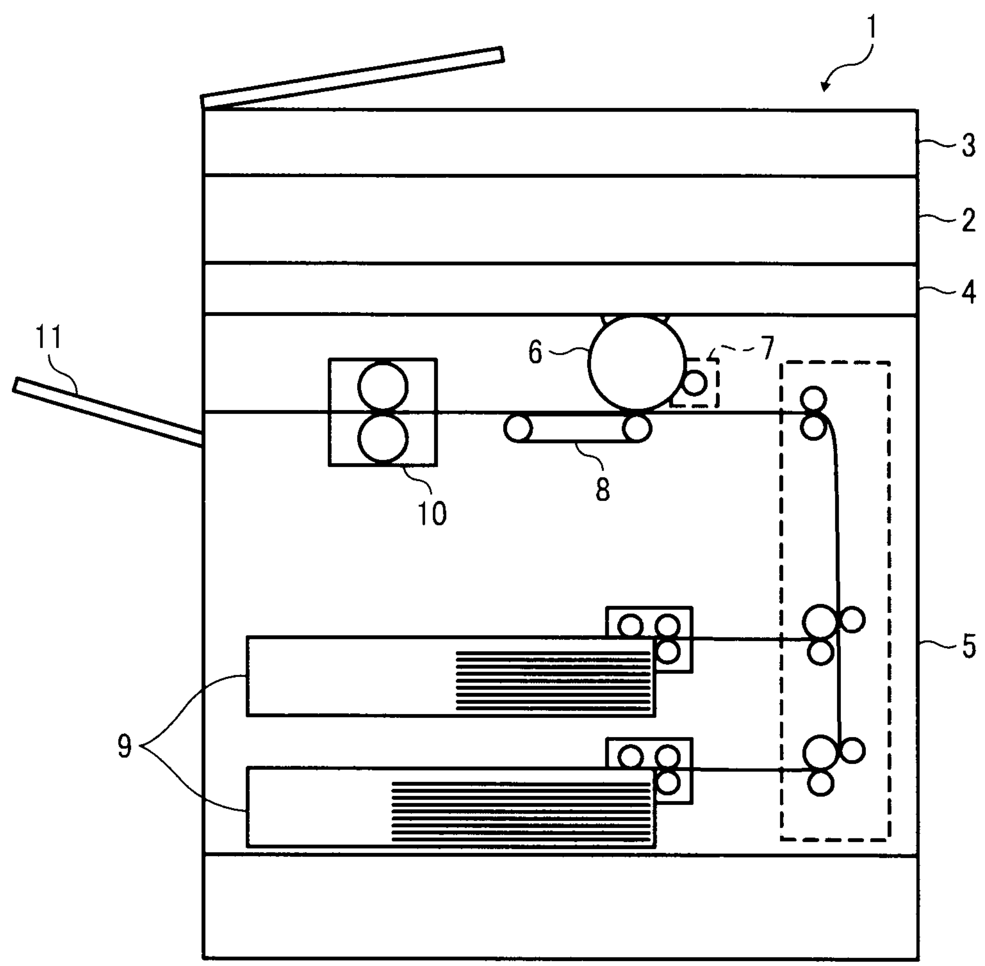
FIG. 13 is a cross-sectional view illustrating a structure of an image forming apparatus having the image reading device of FIG. 1.
Figure 14:
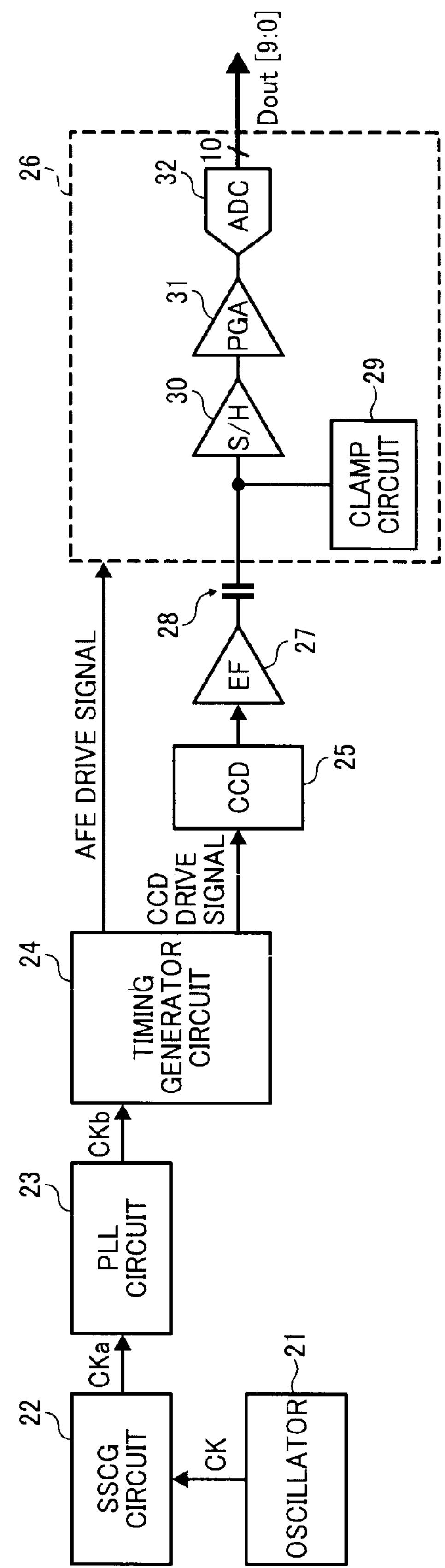
FIG. 14 is a schematic block diagram illustrating a circuit structure of a sensor board of a background image reading device having a SSCG circuit.
Figure 15:
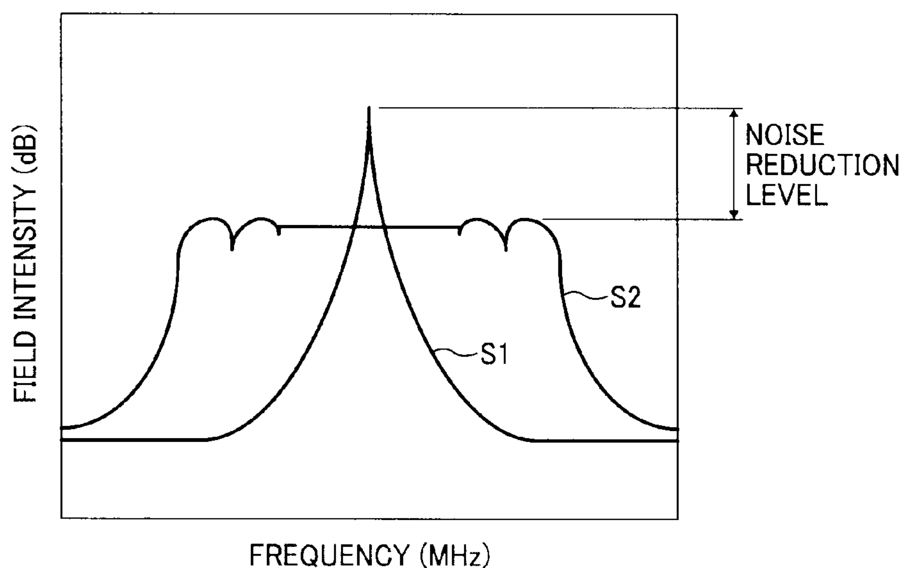
FIG. 15 is a graph illustrating the waveform of an image signal having noises due to SSCG modulation.
Figure 16:
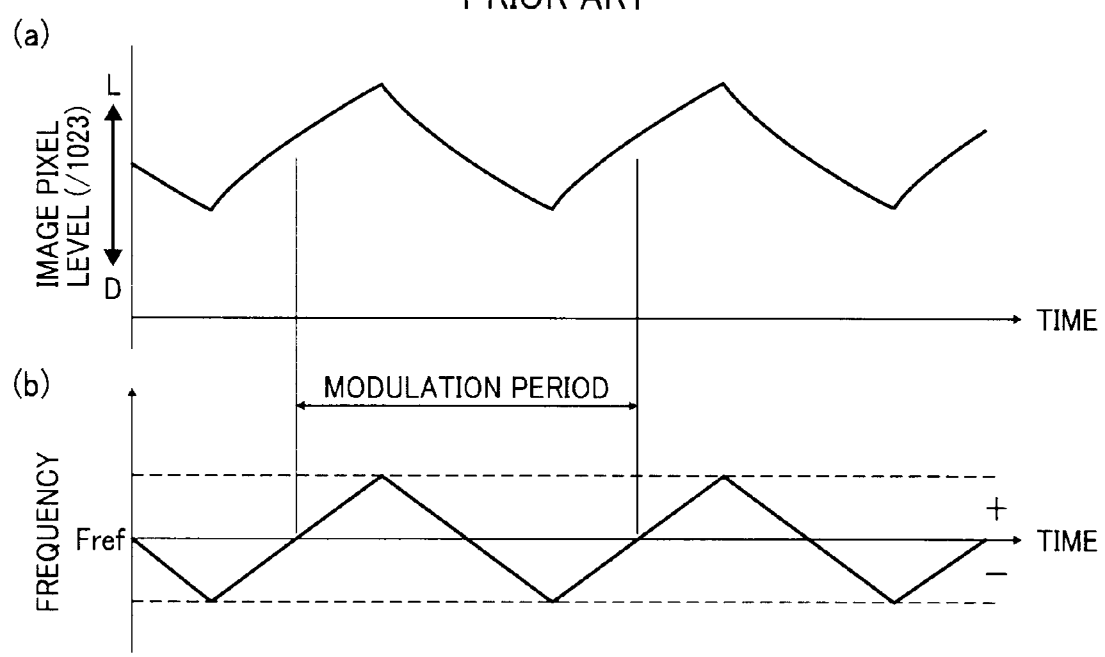
FIG. 16 is a timing chart illustrating an image signal having noises due to a clock signal that is SSCG modulated.
Figure 17:
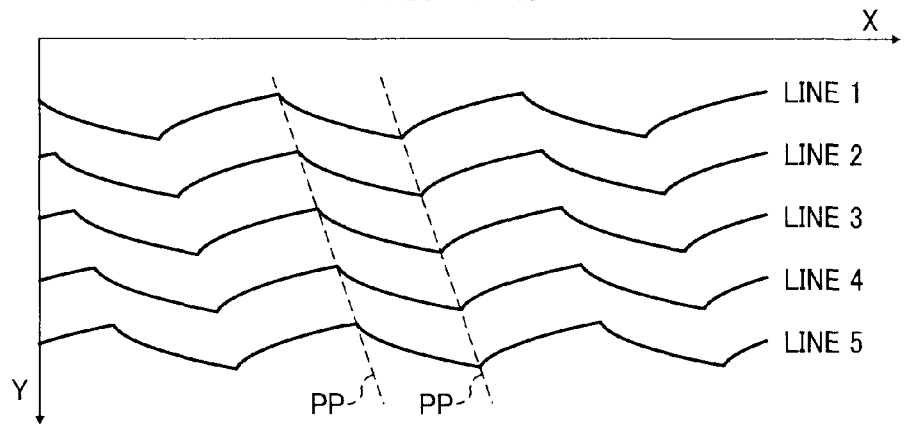
FIG. 17 is an illustration for explaining moiré patterns caused by the image signal having noises due to SSCG modulation.
Figure 18:
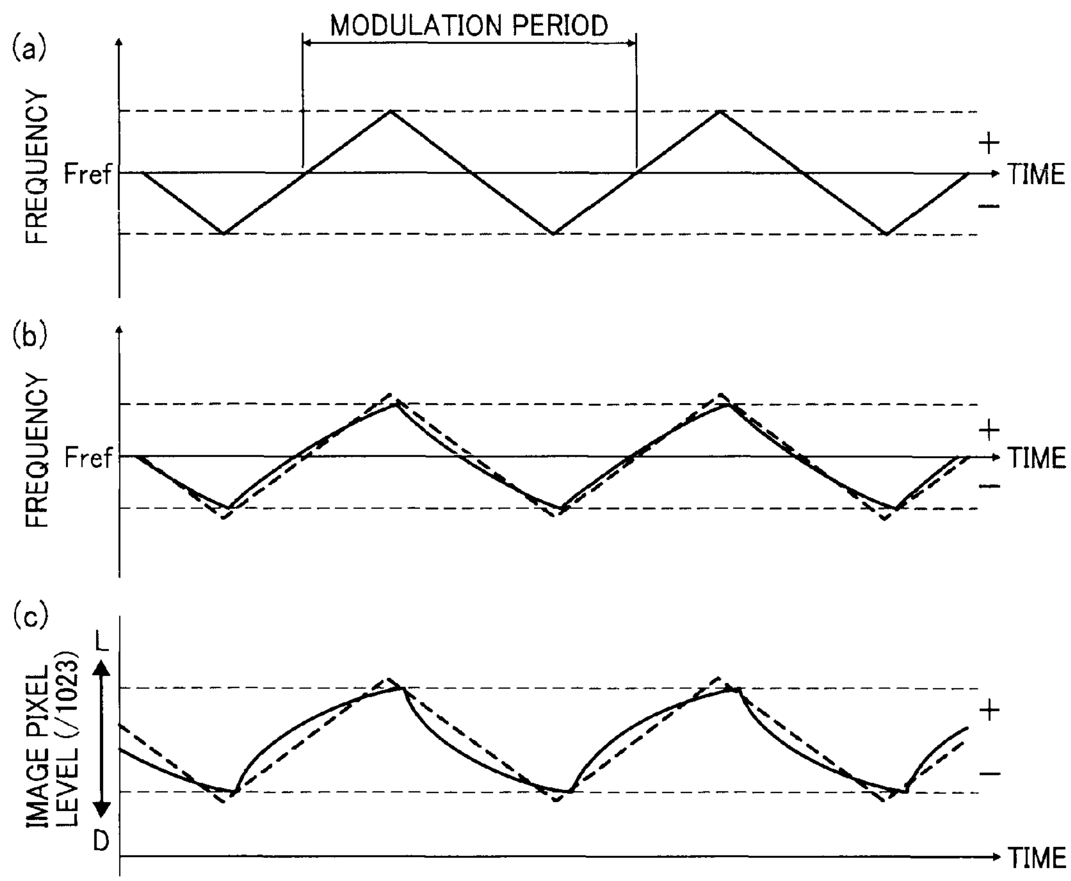
FIG. 18 is a timing chart illustrating an image signal having noises due to SSCG modulation and distortion due to the distorted output signal of the VCO, which is corrected using the technique described in the prior art.

Referring now to FIG. 13, a structure of an image forming apparatus having the above-described image reading device of FIG. 1 is explained according to an example embodiment of the present invention. In FIG. 13, only for a printer unit 5, a cross-sectional view is illustrated.

The image forming apparatus 1 is a digital multifunctional product (MFP) having the functions of copying, printing, scanning, and communicating via facsimile. The image forming apparatus 1 is provided with the image reading device of FIG. 1, which performs the function of image reading. The image forming apparatus 1 mainly includes the image reading device 2, an automatic document feeder (ADF) 3, a writing unit 4, and the printer unit 5.

Using a key provided on an operation unit, the user is able to cause the image forming apparatus 1 to perform one of the functions of copying, printing, scanning, and facsimile transmission. When the copy function is selected, the image forming apparatus 1 is switched to a copy mode to perform copying. When the printer function is selected, the image forming apparatus 1 is switched to a printer mode to perform printing. When the scanner function is selected, the image forming apparatus 1 is switched to a scan mode to perform scanning. When the facsimile transmission mode is selected, the image forming apparatus 1 is switched to a facsimile mode to perform fax communication.

Operation of copying an original document, performed by the image forming apparatus 1 when it is in the printer mode, is explained. In the copy mode, the ADF 3 feeds an original document placed on the ADF 3, one sheet by one sheet, to the image reading device 2. The image reading device 2 reads the original document into image data. The image data is processed by the signal processing IC of the sensor board 112 under control of the control board 115 (FIG. 1). The writing unit 4 irradiates laser lights based on the processed image data.

The printer unit 5 includes a photoconductive drum 6. The writing unit 4 exposes the laser lights toward a surface of the photoconductive drum that is uniformly charged by a charger to form a latent image thereon. The latent image formed on the surface of the photoconductive drum 6 is developed by a developing device 7 into a toner image. The toner image is transferred onto a transfer sheet, which is transferred by a transfer belt 8 after being fed from a sheet cassette 9. The toner image transferred onto the transfer sheet is fixed by a fixing device 10, and discharged onto a sheet discharge tray 11.

In the above-described example, the image forming apparatus 1 is implemented as a digital MFP. Alternatively, any desired image forming apparatus may be provided with the above-described image reading device of FIG. 1. Further, the image forming apparatus may be a color image forming apparatus. In such case, the printer unit 5 of FIG. 13 is implemented as a tandem type image forming device in which a plurality of image forming units are disposed side by side.

Any one of the above-described techniques of correcting the image data is applicable to various devices or apparatuses including an image reading device such as an image scanner that reduces EMI using SSCG modulation, an image forming apparatus provided with the image reading device such as a copier or a facsimile.

Further, any one of the above-described image signal processing circuits may be incorporated in any electronic device other than the image reading device of FIG. 1.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image reading device provided with an image processing circuit, which includes: an oscillating circuit that generates a reference clock signal; a timing generator circuit that modulates frequencies of the reference clock signal to generate a second clock signal in which the frequencies are spread and generates a CCD drive signal for driving a CCD line image sensor; the CCD line image sensor driven by the CCD drive signal to output an analog image signal being converted from image data of an original; and an analog digital converter that converts the analog image signal to a digital image signal.

The timing generator circuit includes means for generating a reading clock signal based on the second clock signal.

The image reading device further includes: a waveform memory that stores correction waveform data, which is a digital image signal output from the image processing circuit when the CCD line image sensor is driven by the CCD drive signal with the light source is turned off; and image signal correcting means for obtaining the correction waveform data read out from the waveform memory according to the reading clock signal when the original document is being read, adjusting an amplitude and a phase of the correction waveform data, and either adding the adjusted correction waveform data in the digital form to the digital image signal output from the analog digital converter or adding the adjusted correction waveform data in the analog form to the analog image signal before being input to the analog digital converter.

The image signal correcting means includes a multiplier/inverter circuit that adjusts the amplitude of the correction waveform data by multiplying a multiplication coefficient to the correction waveform data read out from the waveform memory, and selectively inverts the phase of the correction waveform data.

The image reading device further includes means for determining the multiplication coefficient of the multiplier/inverter circuit and whether to invert the phase of the correction waveform data such that the correction waveform data read out from the waveform memory has the same amplitude and the inverted phase with the waveform of the noises that are superimposed on the digital image signal.

The image signal correcting means may include a digital analog converter that converts the adjusted correction waveform data to an analog signal.

The signal processing circuit may be implemented by an integrated circuit on which the waveform memory and the image signal correcting means are mounted.

The image reading device may be provided in an image forming apparatus, which additionally includes an image forming section that form an image based on the image signal output from the image reading device.

What is claimed is:

1. An image reading device, comprising:
- an oscillating circuit to generate a reference clock signal;
- a timing generator circuit to modulate a frequency of the reference clock signal to generate a second clock signal in which frequency spectrum is spread, and to generate a drive signal and a reading clock signal, the drive signal and the reading clock signal being based on the second clock signal;
- an image sensor, driven by the drive signal output from the timing generator circuit, to convert an optical image of an original image to an analog image signal;
- an image signal processing circuit including an analog-to-digital converter to convert the analog image signal output from the image sensor to a first digital image signal;
- a waveform memory to store correction waveform data, the correction waveform data being a second digital image signal that is output from the analog-to-digital converter when the image sensor is driven by the drive signal with a light source of the image reading device being turned off; and
- an image signal correcting circuit to obtain the correction waveform data read out from the waveform memory based on the reading clock signal, which is supplied to the waveform memory, when the original image is being read, to adjust an amplitude and a phase of the correction waveform data to generate an adjusted correction waveform data, and to add the adjusted correction waveform data to the first digital image signal to output a corrected image signal from which noises due to the frequency modulation of the reference clock signal are removed.

2. The image reading device of claim 1, wherein the image signal correcting circuit includes:
- a multiplier/inverter circuit to multiply the correction waveform data read out from the waveform memory with a multiplication coefficient to adjust the amplitude of the correction waveform data, and to selectively invert the phase of the correction waveform data to adjust the phase of the correction waveform data.

3. The image reading device of claim 2, further comprising:
- a processor to determine the multiplication coefficient of the multiplier/inverter circuit such that the adjusted correction waveform data has an amplitude that is the same as an amplitude of a waveform of noises superimposed on the first digital image signal, and determine whether to invert the phase of the correction waveform data such that the adjusted correction waveform data has a phase that is inverted from a phase of the waveform of the noises superimposed on the first digital image signal.

4. The image reading device of claim 3, further comprising:
- a register to store the multiplication coefficient and information indicating whether to invert the phase of the correction waveform data that are respectively determined by the processor.

5. The image reading device of claim 4, wherein the image signal correcting circuit further includes:
- an adder circuit provided downstream from the analog-to-digital converter to add the adjusted correction waveform data in the digital form to the first digital image signal output from the analog-to-digital converter.

6. The image reading device of claim 1, wherein the image signal processing circuit, the image signal correcting circuit, and the waveform memory are mounted on an integrated circuit.

7. The image reading device of claim 3, further comprising:
- a peak bottom detector circuit provided downstream from the image signal correcting circuit to obtain a difference between a first peak value and a first bottom value of the first digital image signal and a second peak value and a second bottom value of the corrected image signal, wherein
- the processor determines whether to invert or not invert the phase of the correction waveform data based on:
  - a first difference between the first peak value and the first bottom value of the first digital image signal, which is obtained by not adding the correction waveform data to the first digital image signal; and
  - a second difference between the second peak value and the second bottom value of the corrected image signal, which is obtained by adding the adjusted correction waveform data in a non-inverted state to the first digital image signal.

8. The image reading device of claim 3, wherein the processor:
- obtains a first difference between a first peak value and a first bottom value of the corrected image signal, which is obtained with the multiplication coefficient having a first value, and a second difference between a second peak value and a second bottom value of the corrected image signal, which is obtained with the multiplication coefficient having a second value; and
- calculates the multiplication coefficient to be used by the multiplier/inverter circuit, using the first value of the multiplication coefficient, the first difference, the second value of the multiplication coefficient, and the second difference.

9. An image forming apparatus, comprising:

the image reading device of claim 1; and an image forming device to form an image based on the corrected image signal output from the image reading device.

10. The image reading device of claim 7, wherein the processor inverts the phase of the correction waveform data when the second difference is less than the first difference, and does not invert the phase of the correction waveform data when the second difference is greater than the first difference.

11. The image reading device of claim 1, wherein the analog image signal output from the image sensor includes:

a first analog image signal having odd pixels, and a second analog image signal having even pixels.

12. The image reading device of claim 1, wherein the timing generator circuit generates a second drive signal based on the second clock signal and outputs the second drive signal to the analog-to-digital converter.

13. An image reading device, comprising:

means for generating a reference clock signal;

means for modulating a frequency of the reference clock signal to generate a second clock signal in which frequency spectrum is spread, and generating a drive signal and a reading clock signal, the drive signal and the reading clock signal being based on the second clock signal;

means for forming thereon an optical image of an original image and converting the optical image of the original image to an analog image signal according to the drive signal;

means for converting the analog image signal to a first digital image signal;

means for storing correction waveform data, the correction waveform data being a second digital image signal that is output from the means for converting when the means for forming is driven by the drive signal with a light source of the image reading device being turned off; and means for adjusting an amplitude and a phase of the correction waveform data read out from the means for storing based on the reading clock signal, which is supplied to the means for storing, when the original image is being read to generate an adjusted correction waveform data; and means for adding the adjusted correction waveform data to the first digital image signal to output a corrected image signal from which noises due to the frequency modulation of the reference clock signal are removed.

14. The image reading device of claim 13, wherein the means for adjusting includes:

means for multiplying the correction waveform data read out from the means for storing with a multiplication coefficient to adjust the amplitude of the correction waveform data; and means for selectively inverting the phase of the correction waveform data to adjust the phase of the correction waveform data.

15. The image reading device of claim 14, further comprising:

means for determining the multiplication coefficient of the means for multiplying such that the adjusted correction waveform data has an amplitude that is the same as an amplitude of a waveform of noises superimposed on the first digital image signal; and means for determining whether to invert the phase of the correction waveform data such that the adjusted correction waveform data has a phase that is inverted from a phase of the waveform of the noises superimposed on the first digital image signal.

16. The image reading device of claim 15, further comprising:

means for storing the multiplication coefficient and information indicating whether to invert the phase of the correction waveform data.

17. An image reading device, comprising:

an oscillating circuit to generate a reference clock signal;

a timing generator circuit to modulate a frequency of the reference clock signal to generate a second clock signal in which frequency spectrum is spread, and to generate a drive signal and a reading clock signal, the drive signal and the reading clock signal being based on the second clock signal;

an image sensor, driven by the drive signal output from the timing generator circuit, to convert an optical image of an original image to an analog image signal;

a waveform memory to store correction waveform data, the correction waveform data being in digital form and is output when the image sensor is driven by the drive signal with a light source of the image reading device being off;

an image signal correcting circuit to obtain the correction waveform data read out from the waveform memory based on the reading clock signal, which is supplied to the waveform memory, when the original image is being read, to adjust an amplitude and a phase of the correction waveform data to generate an adjusted correction waveform data, to convert the adjusted correction waveform data into an analog-adjusted correction waveform data, and to add the analog-adjusted correction waveform data to the analog image signal to output a corrected analog image signal from which noises due to the frequency modulation of the reference clock signal are removed; and an image signal processing circuit including an analog-to-digital converter to convert the corrected analog image signal to a corrected digital image signal.

18. The image reading device of claim 17, wherein the image signal correcting circuit further includes:

a multiplier/inverter circuit to multiply the correction waveform data read out from the waveform memory with a multiplication coefficient to adjust the amplitude of the correction waveform data, and to selectively invert the phase of the correction waveform data to adjust the phase of the correction waveform data;

a digital-to-analog converter circuit provided downstream from the multiplier/inverter circuit to convert the adjusted correction waveform data from digital to analog; and an adder circuit provided between the digital-to-analog converter and the analog-to-digital converter to add the analog adjusted correction waveform data to the analog image signal input to the analog-to-digital converter.

* * * * *